United States Patent
Sugiura et al.

(10) Patent No.: US 6,630,276 B2
(45) Date of Patent: *Oct. 7, 2003

(54) EXTERNAL ADDITIVE FOR ELECTROPHOTOGRAPHIC TONER, METHOD FOR MANUFACTURING THE EXTERNAL ADDITIVE, ELECTROPHOTOGRAPHIC TONER USING THE EXTERNAL ADDITIVE, AND IMAGE FORMING APPARATUS USING THE ELECTROPHOTOGRAPHIC TONER

(75) Inventors: Hideki Sugiura, Fuji (JP); Tomio Kondou, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 09/985,738

(22) Filed: Nov. 6, 2001

(65) Prior Publication Data

US 2002/0136973 A1 Sep. 26, 2002

(30) Foreign Application Priority Data

Nov. 6, 2000 (JP) .................................. 2000-337943

(51) Int. Cl.⁷ .................................................. G03G 9/00
(52) U.S. Cl. ........................................ 430/108.3; 430/45
(58) Field of Search ................................ 430/108.3, 45

(56) References Cited

U.S. PATENT DOCUMENTS

| | | | |
|---|---|---|---|
| 4,762,763 A | 8/1988 | Nomura et al. | |
| 4,933,250 A | 6/1990 | Nakayama et al. | |
| 4,950,573 A | 8/1990 | Yamaguchi et al. | |
| 4,980,258 A | 12/1990 | Aoki et al. | |
| 5,164,774 A | 11/1992 | Tomita et al. | |
| 5,344,732 A | 9/1994 | Chiba et al. | |
| 5,380,616 A | 1/1995 | Aoki et al. | |
| 5,403,690 A | 4/1995 | Kuramoto et al. | |
| 5,519,316 A | 5/1996 | Hagiwara et al. | |
| 5,527,657 A | 6/1996 | Takeda et al. | |
| 5,554,478 A | 9/1996 | Kuramoto et al. | |
| 5,721,083 A | 2/1998 | Masuda et al. | |
| 5,789,131 A | 8/1998 | Mikuriya et al. | |
| 5,840,456 A | 11/1998 | Tomita et al. | |
| 5,882,832 A | 3/1999 | Tosaka et al. | |
| 5,981,131 A | 11/1999 | Hirama et al. | |
| 6,004,715 A | 12/1999 | Suzuki et al. | |
| 6,074,794 A | 6/2000 | Fushimi et al. | |
| 6,074,795 A | 6/2000 | Watanabe et al. | |
| 6,168,894 B1 | 1/2001 | Aoki et al. | |
| 6,180,298 B1 | 1/2001 | Kuroda et al. | |
| 6,183,926 B1 | 2/2001 | Kuroda et al. | |
| 6,258,502 B1 | 7/2001 | Nakamura et al. | |
| 6,303,258 B1 | 10/2001 | Katoh et al. | |
| 6,360,068 B1 | 3/2002 | Kinoshita et al. | |
| 6,363,229 B1 | 3/2002 | Shiraishi et al. | |
| 6,432,589 B1 | 8/2002 | Uchinokura et al. | |
| 6,503,676 B2 * | 1/2003 | Yamashita et al. | 430/108.3 |

FOREIGN PATENT DOCUMENTS

| | | |
|---|---|---|
| EP | 0 410 482 | 1/1991 |
| EP | 0 658 819 | 6/1995 |
| EP | 1 150 175 | 10/2001 |
| JP | 61-277964 | 12/1986 |
| JP | 1-253780 | 10/1989 |
| JP | 7-271087 | 10/1995 |
| JP | 8-292598 | 11/1996 |
| JP | 11-212299 | 8/1999 |

OTHER PUBLICATIONS

Patent Abstracts of Japan, JP 11–212299, Aug, 8, 1999.

* cited by examiner

*Primary Examiner*—Mark A. Chapman
(74) *Attorney, Agent, or Firm*—Oblon, Spivak, McClelland, Maier & Neustadt, P.C.

(57) ABSTRACT

An external additive for a toner, which has an average particle diameter not greater than 100 nm and includes an inorganic particulate material; and a hydrophobizing agent which is present on the inorganic particulate material in an amount of Ws by weight and present as a free hydrophobizing agent in an amount of Wf by weight, wherein a residual ratio defined as a ratio $\{Ws/(Ws+Wf)\} \times 100$ is from 40 to 98.5%, and wherein at least one of a compound having an organopolysiloxane structure and a compound having a ring siloxane structure is detected when the external additive is analyzed by a pyrolysis gas chromatography mass spectroscopy method after the external additive is washed with chloroform.

33 Claims, 9 Drawing Sheets

EXTERNAL ADDITIVE FOR ELECTROPHOTOGRAPHIC TONER, METHOD FOR MANUFACTURING THE EXTERNAL ADDITIVE, ELECTROPHOTOGRAPHIC TONER USING THE EXTERNAL ADDITIVE, AND IMAGE FORMING APPARATUS USING THE ELECTROPHOTOGRAPHIC TONER

BACKGROUND OF THE INVENTION

1. Field of the Invention

The present invention relates to an external additive for an electrophotographic toner, a method for manufacturing the external additive, an electrophotographic toner using the external additive, and an image forming apparatus using the toner. More particularly, the present invention relates to an external additive for an electrophotographic toner useful for monochrome or full color image forming apparatus using electrophotography, such as copiers, laser printers and facsimile machines.

2. Discussion of the Background

Image forming processes such as electrophotography, electrostatic recording and electrostatic printing typically include the following processes.

(1) an imagewise electrostatic latent image is formed on an image bearing member such as photoreceptors and dielectric materials (electrostatic latent image forming process);

(2) the electrostatic latent image is developed by a developer including a toner to form a toner image on the image bearing member (developing process);

(3) the toner image is then transferred onto a receiving material such as paper optionally via an intermediate transfer medium (transfer process); and (4) the toner image on the receiving material is fixed thereon, for example, upon application of heat and pressure.

As the developer, two-component developers including a carrier and a toner, and one-component developers including a magnetic or non-magnetic toner and not including a carrier, are known.

The toners are classified into positively-charge toners and negatively-charged toners. As the materials which impart a positive charge to a toner, charge controlling agents such as nigrosine dyes and quaternary ammonium salts, coating agents such as acrylic resins, fluorine-containing resins and silicone resins which are coated on the surface of a carrier, etc., are known.

As the materials which impart a negative charged to a toner, charge controlling agents such as metal-containing azo dyes, additives such as inorganic fillers and organic fillers, coating agents which are coated on the surface of a carrier, are known.

In addition, it is proposed that in order to improve the fluidity and charging properties of a toner, an inorganic filler such as metal oxides is mixed with toner particles. Such an inorganic filler is called as an external additive.

Further, it is also proposed that the surface of such an inorganic filler is treated with an agent such as silane coupling agents, titanate coupling agents, silicone oils and organic acids or coated with a resin, to improve the hydrophobic property and charging properties of the inorganic filler.

Specific examples of such inorganic fillers include silica, titanium oxide (titania), aluminum oxide, zinc oxide, magnesium oxide, cerium oxide, iron oxide, copper oxide and tin oxide. In particular, hydrophobized particulate silicas which are prepared by reacting silica with an organic silicon compound such as dimethyldichlorosilane, hexamethyldisilazane and silicone oils to substitute the silanol groups on the surface of the silica with an organic group are preferably used. Among these hydrophobizing agents, silicone oils are preferable because the treated inorganic fillers have good hydrophobic property, and the resultant toner has low surface energy and thereby the toner has good transferability.

Japanese Patent Publication No. 07-3600 and Japanese Patent No. 2,568,244 have disclosed that a silica treated with a silicone oil and having a specific hydrophobic degree is used as an external additive.

In addition, in Japanese Laid-Open Patent Publications Nos. 07-271087 and 08-292598, addition quantity of a silicone oil serving as a treating agent and the content of carbon in the external additive are specified.

By these methods, the requirements such that an inorganic filler serving as a mother material of the external additive has to be hydrophobized and the charge properties of the resultant developer have to be stabilized even under high humidity conditions can be fulfilled.

However, a positive action to decrease adhesion of the resultant toner to various members in image forming apparatus, such as contact chargers, developer bearing members (i.e., sleeves), doctor blades, carriers, electrostatic latent image bearing members (i.e., photoreceptors) and intermediate transfer media, has not been taken.

In particular, when adhesion of a developer to a photoreceptor is too strong, problems tend to occur such that the resultant toner image has background fouling and/or the resultant character images, line images and dot images have omissions at their edge portions or center portions. These problems cannot be solved only by adjusting the addition quantity of the silicone oil to be added and/or the hydrophobic degree of the resultant external additive.

In addition, an image omission problem such that the resultant toner cannot be transferred onto recessed portions of a rough receiving material cannot be solved by these methods.

Japanese Laid-Open Patent Publication No. 11-212299 discloses an inorganic filler which includes a liquid silicone oil in a specific amount. However, as mentioned above, the above-mentioned problems cannot be solved by such a method (i.e., a method of adjusting the addition quantity of a hydrophobizing agent). In addition, there are no answers in the patent publication to the following questions:

(1) "How should an inorganic filler be treated with a silicone oil in order to effectively solve the problems?"; and (2) "What is the structure of the effective silicones oil or their equivalents?"

In addition, the patent publication (JOP 11-212299) does not mention about the preferable functional component and structure of the treating agent and the preferable mixing state of such a treating agent with an inorganic filler.

Because of these reasons, a need exists for an external additive by which a toner which does not contaminate various image forming members such as chargers, developing devices, photoreceptors, and intermediate transfer media and can produce high quality toner images without causing background fouling and image omissions even when the toner is used for a long period of time can be produced.

SUMMARY OF THE INVENTION

Accordingly, an object of the present invention is to provide an external additive by which a toner which does not contaminate various image forming members such as chargers, developing devices, photoreceptors, and intermediate transfer media and can produce high quality toner images without causing background fouling and image omissions even when the toner is used for a long period of time can be produced.

Another object of the present invention is to provide a method for effectively manufacturing such an external additive.

Yet another object of the present invention is to provide a toner which does not contaminating various image forming members such as chargers, developing devices, photoreceptors, and intermediate transfer media and can produce high quality toner images on various receiving materials without causing background fouling and image omissions even when used for a long period of time.

A further object of the present invention is to provide a developing device which can produce high quality toner images on various receiving materials without causing background fouling, image omissions and scattered images even when the toner is used for a long period of time.

Briefly these objects and other objects of the present invention as hereinafter will become more readily apparent can be attained by an external additive for a toner, which has an average particle diameter not greater than 100 nm and which includes an inorganic particulate material and a hydrophobizing agent, which agent is present on the surface of the inorganic particulate material in an amount of Ws by weight and present as a free hydrophobizing agent in an amount of Wf by weight, wherein a residual ratio {Ws/(Ws+Wf))×100 is from 40 to 98.5%, and wherein when at least one of a compound having an organopolysiloxane structure and a compound having a ring siloxane structure is detected when the external additive is analyzed by a pyrolysis gas chromatography mass spectroscopy (Py-GCMS) method after the external additive is washed by chloroform.

The compound having an organopolysiloxane structure preferably has the following formula (1):

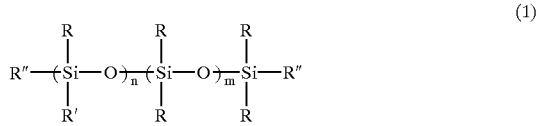

(1)

wherein R represents an alkyl group having from 1 to 3 carbon atoms; R' represents a silicone oil modification group such as an alkyl group, a halogenated alkyl group, a phenyl group or a modified phenyl group; R" represents an alkyl group having from 1 to 3 carbon atoms or an alkoxyl group; and n and m are independently an integer and satisfy the following relationship:

1·(n+m)

The compound having a cyclic siloxane structure preferably has the following formula (2):

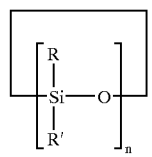

(2)

wherein R represents an alkyl group having from 1 to 3 carbon atoms; R' represents a silicone oil modification group such as alkyl group, a halogenated alkyl group, a phenyl group or a modified phenyl group; and n is an integer not less than 3, and preferably not less than 4.

The hydrophobizing agent is preferably a silicone oil or a silicone varnish, and the inorganic particulate material is preferably silica, titanium oxide or alumina.

In another aspect of the present invention, a method for manufacturing an external additive for a toner is provided which includes the step of treating an inorganic particulate material with a hydrophobizing agent while heating such that the resultant external additive mentioned above is prepared. Alternatively the heating operation may be performed after the hydrophobizing treatment.

In yet another aspect of the present invention, a toner is provided which includes a colorant, a binder resin and the external additive mentioned above, wherein the toner has a volume average particle diameter not greater than 15 μm and an agglomeration degree of from 5 to 70%. The toner may include a second external additive having an average primary particle diameter smaller than that of the first-mentioned external additive, and/or a particulate resin serving as a third external additive and having an average particle diameter greater than the average primary particle diameter of the first-mentioned external additive.

In a further aspect of the present invention, an image forming apparatus is provided which includes an image bearing member configured to bear an electrostatic latent image thereon, an image developer configured to develop the latent image with a developer including the toner mentioned above to form a toner image on the image bearing member, an image transferer configured to transfer the toner image onto a receiving material optionally via an intermediate transfer medium while contacting the image bearing member with the receiving material (or the intermediate transfer medium) therebetween.

The latent image may be plural electrostatic latent images formed on respective areas of the image bearing member or plural image bearing members. Each of the plural latent images is developed with a different color developer including a color toner to form plural color toner images onto a receiving material one by one or at the same time, wherein the color toner is the toner of the present invention.

The image developer may include plural color image developing sections each including a developing roller configured to bear a different color developer and a regulating blade configured to form a developer layer on the developing roller, wherein the color developer is the toner of the present invention.

The image forming apparatus may have plural image bearing members on which a different color toner image is formed. The plural color toner images are transferred on a receiving material one by one or transferred on an intermediate transfer medium one by one and then transferred onto a receiving material at the same time.

As the developer for use in the image forming apparatus, both one-component developers and two-component developers can be used.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
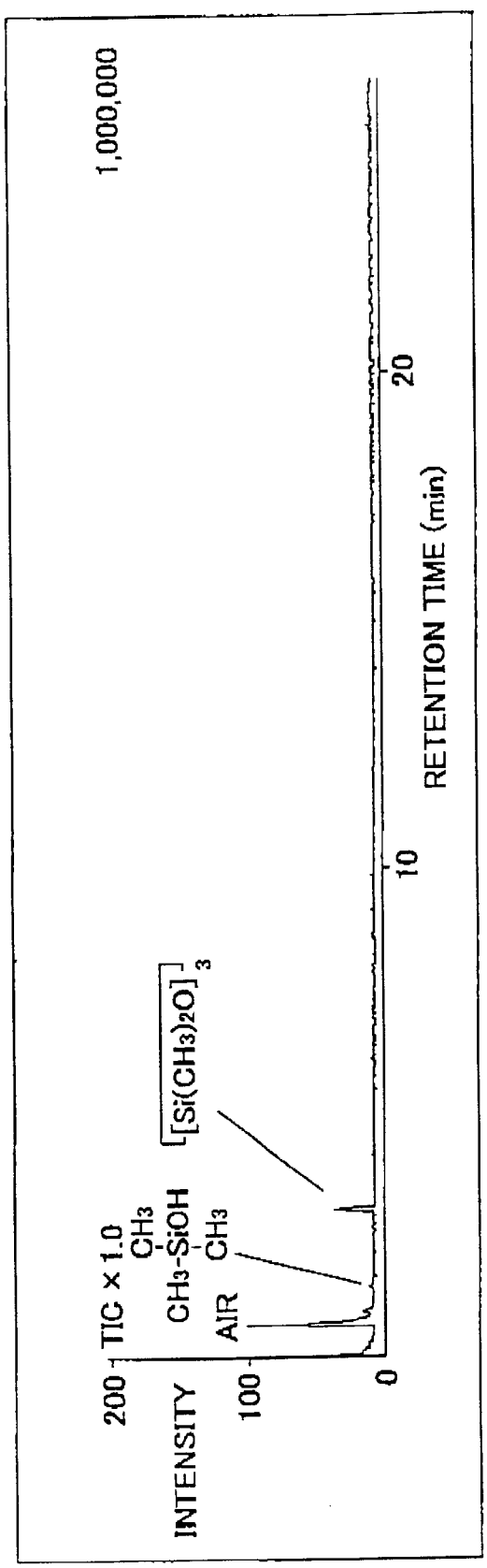
FIG. 1 is a chromatogram of pyrolysis gas chromatography mass spectroscopy (Py-GCMS) of compounds present on the inorganic particulate material after the external additive of Example 3 is washed by chloroform.

As a result of the present inventors' investigation to solve the above-mentioned problems, it is found that the first object of the present invention can be attained by an external additive which includes an inorganic particulate material having an average particle diameter not greater than 100 nm and a hydrophobizing agent, which is present on the surface of the inorganic particulate material in an amount of Ws by weight and present as a free hydrophobizing agent in an amount of Wf by weight, wherein a residual ratio $\{Ws/(Ws+Wf)\} \times 100$ is from 40 to 98.5%, and wherein at least one of a compound having an organopolysiloxane structure and a compound having a ring siloxane structure is detected when the external additive is analyzed by a pyrolysis gas chromatography mass spectroscopy (Py-GCMS) method after the external additive is washed by chloroform.

When this external additive is used for a toner, the resultant toner does not contaminate various image forming members such as chargers, developing devices, photoreceptors, and intermediate transfer media and can stably produce high quality toner images without causing background fouling, image omissions and blurred images even when used for a long period of time. Thus the present invention is made.

When the external additive, which includes an inorganic particulate material treated with a hydrophobizing agent, is washed with a solvent such as chloroform, a compound having an organopolysiloxane structure remains in the residue. This means that a compound having an organopolysiloxane such as silicone oils are present on the inorganic particulate material while the compound is physically adsorbed on the inorganic particulate material or chemically bonded with the surface of the inorganic particulate material such that the compound is not easily released from the inorganic particulate material by treating (washing) the external additive with the solvent.

When a toner including an external additive in which such a compound mentioned above is present on the surface of an inorganic particulate material while being physically adsorbed on or chemically bonded with the surface of the inorganic particulate material, the friction coefficient of the image bearing member (i.e., the photoreceptor) to be contacted with the toner is decreased because the compound has low surface energy, and thereby the abrasion quantity of the surface of the photoreceptor can be decreased.

In addition, when contaminating materials and materials having a reverse charge or a low charge, which are included in the developer and receiving paper used, are adhered to the photoreceptor, images having background fouling are produced. By using such a toner mentioned above, the chance that the contaminating materials adhere to the photoreceptor can be decreased, and thereby high quality toner images without background fouling can be produced.

Further, when a toner including the external additive of the present invention (i.e., toner particles, on the surface of which the external additive of the present invention adheres) is used, the adhesion of a toner particle to other toner particles, which are covered by the external additive treated with the same hydrophobizing agent, increases whereas adhesion of a toner particle to the photoreceptor and intermediate transfer medium decreases.

In general, the reason why omissions are produced character images, line images and dot images is considered as follows. Toner particles tend to be adhered to edge portions or center portions of such images in an amount greater than those of the toner particles adhered to the other portions. The toner particles of the toner images are pressed by the receiving material (i.e., a transfer member) and thereby the adhesion of the toner particles to the photoreceptor or intermediate transfer medium increases. Therefore the toner particles cannot be transferred to the receiving material by a predetermined electric field applied to transfer the toner images, resulting in formation of image omissions.

The present inventors discover that when the toner of the present invention (i.e., toner particles including the external additive in which a compound having an organopolysiloxane structure is physically adsorbed on or is chemically bonded with the surface of an inorganic material) is used, adhesion of the toner to the photoreceptor and intermediate transfer medium decreases, and therefore, even when the toner is strongly pressed by an inflexible or hard receiving material, image omissions are not produced in the transferred image.

In attempting to prevent the image omission problem, a technique in which a large amount of an external additive is added to a toner to increase the coverage of the toner with the external additive (i.e., to decrease adhesion of the toner to a photoreceptor) has been conventionally used. In such a case, blurred images or scattered toner images tend to be produced on a receiving material because a toner particle in the toner image repulses toner particles in the vicinity of the toner particle when the toner image is transferred on the receiving material.

In the toner of the present invention, cohesion force between toner particles is increased, and thereby the blurred image problem and scattered image problem can be prevented while the image omission problem is also prevented.

The toner of the present invention can be preferably used for full color image forming apparatus in which a toner image is transferred plural times (for example, a toner image is first transferred on an intermediate transfer medium and then transferred onto a receiving material).

As mentioned above, toner particles of the toner of the present invention have high cohesion force, toner particles in a toner image can be transferred onto a receiving material while forming united particles. Therefore, the toner image can be uniformly transferred even on a rough receiving material or a receiving paper in which the fiber-to-fiber length is very long.

In general, hydrophobizing agents such as silicone oils are soluble in chloroform or the like solvent, but inorganic particulate materials is insoluble in such a solvent. Therefore, when an external additive (or toner) is treated by such a solvent, free hydrophobizing agent therein dissolves in the solvent and does not remain in the residue.

In the present invention, the amount of a silicone oil strongly adhered physically on the surface of an external additive or a compound having a polysiloxane structure bonded with the surface of an external additive can be determined by the above-mentioned method in which the components in the external additive washed with a solvent are identified.

In addition, when the insoluble materials which remains even after the external additive is treated with a solvent are heated to be decomposed and the decomposition products include a compound having a ring siloxane structure, the external additive can exhibit the same effects as those of the external additive mentioned above (i.e., the external additive including a compound having an organopolysiloxane structure even after washed with a solvent.

In such a case, when the ring is a ring having four or more members (i.e., the ring is a tetragon, pentagon, hexagon, etc.), the external additive has low surface energy and thereby the effects of the present invention can be further heightened.

The effects of the present invention (i.e., the image omission problem, blurred image problem and scattered image problem can be solved at the same time) can be enhanced when an external additive is hydrophobized, and in addition a compound having an organopolysiloxane structure is present in the insoluble materials even after the external additive is treated with a solvent, or a compound having a ring siloxane structure is included in the heat-decomposition products of the insoluble materials.

In order that the compound having an organopolysiloxane structure or a ring siloxane structure exhibits its effects, it is important that the compound is present on/in the external additive or the toner at a proper residual ratio without being easily freed therefrom.

In addition, it is important to control the agglomeration degree of the toner, in order to control the quantity (residual ratio) of the compound having an organopolysiloxane structure or a ring siloxane structure and insoluble in chloroform on/in the inorganic particulate material.

In the present invention, the residual ratio R is defined as follows:

$$R=(Ws/W)\times 100=\{Ws/(Ws+Wf)\}\times 100\ (\%)$$

wherein Ws represents the weight of the hydrophobising agent present on the inorganic particulate material, W represents the weight of the total hydrophobising agent, and Wf represents the weight of the free hydrophobizing agent.

Namely, the residual ratio R is a weight ratio of the remaining hydrophobized agent to the total hydrophobizing agent.

The residual ratio R of the hydrophobizing agent changes depending on the particle diameter, surface area, reactivity, absorbing property, etc. of the inorganic particulate material to be hydrophobized.

When the residual ratio is too small (i.e., the quantity of the free hydrophobizing agent is large), the free hydrophobizing agent adversely affects. In contrast, when the residual ratio is too large, the addition quantity of the hydrophobizing agent is insufficient, and therefore it is not preferable.

By controlling the residual ratio of a hydrophobizing agent, the qualities of the resultant external additive (i.e., the resultant toner) can be controlled regardless the inorganic particulate material used. Therefore this method of specifying the residual ratio can be universally used for any inorganic particulate materials.

Suitable hydrophobizing agents for use in the present invention include silicone oils, silane coupling agents, silylation agents, silane coupling agents having a fluorinated alkyl group, organic titanium coupling agents, aluminum coupling agents, and their combinations, etc.

Specific examples of such hydrophobizing agents include dimethyldichlorosilane, trimethylchlorosilane, methyltrichlorosilane, allyldimethylchlorosilane, allylphenyldichlorosilane, benzyldimethylchlorosilane, bromomethyldimethylchlorosilane, •-chloroethyltrichlorosilane, p-chloroethyltrichlorosilane, chloromethyldimethylchlorosilane, chloromethyltrichlorosilane, p-chlorophenyltrichlorosilane, 3-chloropropyltrichlorosilane, 3-chloropropyltrimethoxylsilane, vinyltriethoxysilane, vinylmethoxysilane, vinyl-tris (•-methoxyethoxy) silane, •-methacryloxypropyltrimethoxysilane, vinyltriacetoxysilane, divinyldichlorosilane, dimethylvinylchlorosilane, octyl-trichlorosilane, decyl-trichlorosilane, nonyl-trichlorosilane, (4-tert-propylphenyl)-trichlorosilane, (4-tert-butylphenyl)-trichlorosilane, dipentyl-dichlorosilane, dihexyl-dichlorosilane, dioctyl-dichlorosilane, dinonyl-dichlorosilane, didecyl-dichlorosilane, didodecyl-dichlorosilane, dihexadecyl-dichlorosilane, (4-tert-butylphenyl)-octyl-dichlorosilane, dioctyl-dichlorosilane, didecenyl-dichlorosilane, dinonenyl-dichlorosilane, di-2-ethylhexyl-dichlorosilane, di-3,3-dimethylpentyl-dichlorosilane, trihexyl-chlorosilane, trioctyl-chlorosilane, tridecyl-chlorosilane, dioctyl-methyl-chlorosilane, octyl-dimethyl-chlorosilane, (4-tert-propylphenyl)-diethyl-chlorosilane, octyltrimethoxysilane, hexamethyldisilazane, hexaethyldisilazane, hexatolyldisilazane, etc., but are not limited thereto.

Specific examples of the silicone oils include dimethylsilicone oils, methylphenylsilicone oils, chlorophenylsilicone oils, methylhydrodienesilicone oils, alkyl-modified silicone oils, fluorine-modified silicone oils, polyether-modified silicone oils, alcohol-modified silicone oils, amino-modified silicone oils, epoxy-modified silicone oils, epoxy/polyether-modified silicone oils, phenol-modified silicone oils, carboxyl-modified silicone oils, mercapto-modified silicone oils, acrylic-modified silicone oils, methacrylic-modified silicone oils, •-methylstyrene-modified silicone oils, etc.

Specific examples of the inorganic particulate materials for use in the external additive of the present invention include silica, alumina, titanium oxide, barium titanate, magnesium titanate, calcium titanate, strontium titanate, iron oxide, copper oxide, zinc oxide, tin oxide, silica sand, clay, mica, wollastonite, diatom earth, chromium oxide, cerium oxide, red iron oxide, antimony trioxide, magnesium oxide, zirconium oxide, barium oxide, barium carbonate, calcium carbonate, silicon carbide, silicon nitride, etc.

Among these materials, silica and titanium dioxide are preferably used.

The addition quantity of the inorganic particulate material is from 0.1 to 5% by weight, and preferably from 0.3 to 3% by weight of the toner.

Specific examples of the suitable inorganic particulate material include MOX80 having an average particle diameter of about 30 nm, OX50 having an average particle diameter of about 40 nm, and TT600 having an average particle diameter of about 40 nm, all of which are manufactured by Nippon Aerosil Co.; IT-PB having an average particle diameter of about 40 nm, and IT-PC having an average particle diameter of about 60 nm, both of which are manufactured by Idemitsu Kosan Co., Ltd.; and TAF110A having an average particle diameter of from about 40 nm to 50 nm, and TAF510 having an average particle diameter of from about 40 nm to 50 nm, both of which are manufactured by Fuji Titanium Industry Co., Ltd. These inorganic materials can be used alone or in combination.

The average primary particle diameter of the inorganic particulate material, which has been treated with a hydrophobizing agent, for use as the external additive is preferably not greater than 100 nm, more preferably from 5 to 70 nm, and even more preferably from 10 to 50 nm.

When the average primary particle diameter is too large, the surface area of the inorganic material decreases, and thereby the contact area of the hydrophobizing agent borne on the inorganic particulate material with the surface of the photoreceptor decreases. Therefore, the effects of the present invention are hardly exerted. In addition, when the average particle diameter is too large, the resultant toner tends to unevenly abrade the surface of the photoreceptor, and therefore it is not preferable. In the present invention, the average particle diameter of the inorganic particulate material means the number average primary particle diameter.

In the present invention, the average particle diameter of an inorganic material can be measured by a particle diameter distribution measuring instrument, which measures particle diameter utilizing dynamic light scattering. Specific examples of the instruments include DLS-700 manufactured by Otsuka Electronics Co., Ltd. and Coulter N4 manufactured by Coulter Electronics, Inc. However, since it is impossible to dissociate the aggregated inorganic material (i.e., to dissociate secondary particles) when the average primary particle diameter thereof is measured by a method using such an instrument, it is preferable to directly determine the primary particle diameter using a scanning electron microscope or a transmission electron microscope. It is more preferable to directly observe the external additive on the surface of a toner particle using a field emission type scanning electron microscope (FE-SEM) at a magnification of from 50,000 to 100,000. In this case, it is preferable that at least 100 particles of an inorganic particulate material are observed to obtain the average of the major particle diameter thereof (i.e., the diameter in the major axis direction).

The method for treating an inorganic particulate material with a hydrophobizing agent will be explained. The treatment is performed, for example, as follows:

(1) an inorganic particulate material is heated in an oven, which is heated at several hundred degree C., to fully remove water from the inorganic particulate material; and (2) the inorganic particulate material is uniformly contacted with a hydrophobizing agent such that the hydrophobizing agent adheres on the surface of the inorganic particulate material.

In order to adhere a hydrophobizing agent to an inorganic material, for example, one of the following methods can be used:

(1) an inorganic particulate material is directly mixed with a hydrophobizing agent using a mixer having a rotating blade or the like mixer; and (2) an inorganic particulate material is dipped into a mixture of a hydrophobizing agent and a solvent having relatively low boiling point and capable of diluting the hydrophobizing agent, and then the solvent is dried to remove the solvent therefrom.

When the hydrophobizing agent to be coated has a high viscosity, it is preferable to use the latter method.

The inorganic particulate material treated with the hydrophobizing agent is then heated in an oven heated at a temperature of from $100°$ to several hundred degree C. By this heat treatment, the metal in the inorganic material can be combined with the hydrophobizing agent by forming a siloxane bonding using a hydroxyl group on the surface of the inorganic particulate material, and/or the silicone oil itself can be polymerized and crosslinked.

In this case, a catalyst such as acids, alkalis, metal salts such as zinc octylate, tin octylate and dibutyl tin dilaurate may be added to the silicone oil to accelerate the reaction.

In this case, a silicone oil is preferably used as the hydrophobizing agent.

In addition, the inorganic particulate material may be subjected to a treatment with a hydrophobizing agent such as silane coupling agent followed by a treatment with a silicone oil. It is preferable that an inorganic particulate material is preliminarily hydrophobized, because the amount of the silicone oil which the surface of the material adsorbs increases.

The thus heat-treated inorganic particulate material include a compound having an organopolysiloxane structure even after the inorganic particulate material is treated with a solvent. Alternatively, a compound having a ring siloxane structure is included in the heat-decomposition products of the inorganic particulate material treated (washed) with a solvent.

The organopolysiloxane structure or ring siloxane structure is that of the silicone oil physically adsorbed strongly on the fine holes on the surface of the inorganic particulate material or the compound having an organopolysiloxane structure chemically bonded with the surface of the inorganic particulate material.

Specifically, the compound having an organopolysiloxane structure or ring siloxane structure is included in the materials insoluble in a solvent, and is detected by the method mentioned below.

The structure of the components in the residue obtained after the external additive is treated (i.e., washed) with a solvent can be determined by the following pyrolysis gas chromatography-mass spectroscopy (Py-GCMS) method. However, the measuring method is not limited thereto.

(1) Treatment with a Solvent

A sample to be analyzed is added in chloroform, and the mixture is agitated and then allowed to settle. The mixture is centrifuged and then the supernatant is removed to obtain the precipitate. Then chloroform is added to the thus prepared precipitate, and the mixture is agitated and then allowed to settle. This procedure is repeated to obtain a residue (i.e., to remove the free hydrophobizing agent). The components of the residue are analyzed by the following Py-GCMS method.

(2) Analysis Using Py-GCMS Method

Analysis is performed under the following conditions using the following instrument.

Instrument: QP5000 and CRASS-5000 manufactured by Shimazu Corp.

Pyrolysis gas chromatography: JHP-3S manufactured by Nippon-Analytical Instruments Co., Ltd.

Pyrolysis temperature: 670 for 4 seconds

Column: DB-5 manufactured by J & W Co.

30 m (length)

0.25 mm (inside diameter)

0.25 μm (film thickness)

Column temperature: 40° (maintained for 2 minutes) to 320•

Column temperature rising speed: 10°/min

Injection temperature: 320•

Pressure of carrier gas: 90 kPa (maintained for 2 min.) to 150 kPa

Pressure rising speed: 2 kPa/min

Ionization method: EI method

Electronic voltage: 70 eV

Mass detection range: 25 m/z to 650 m/z

Rod used for analysis: cylindrical quadrapole

Voltage of detector: 1.10 V

The organopolysiloxane structure and ring siloxane structure can be measured by analyzing the Py-GC pyrogram and mass spectrum pattern.

The residual ratio of the hydrophobizing agent can be determined as follows.

(1) Treatment with a Solvent

A sample to be measured is added in chloroform, and the mixture is agitated and then allowed to settle. The mixture is centrifuged and then the supernatant is removed to obtain the precipitate. Then chloroform is added to the thus prepared precipitate, and the mixture is agitated and then allowed to settle. This procedure is repeated to remove the free hydrophobizing agent.

(2) Determination of Carbon Amount

The carbon amount of the sample is determined using a CHN element analyzing instrument (CHN Corder MT-5, manufactured by Yanako Co., Ltd.)

(3) Determination of Residual Ratio

The residual ratio of the hydrophobizing agent is determined by the following equation:

$$\text{Residual ratio} = (C_1/C_0) \times 100 \, (\%)$$

wherein $C_0$ represents the carbon amount of the sample before the treatment using a solvent, and $C_1$ represents the carbon amount of the sample after the treatment.

In the present invention, the residual ratio of the hydrophobizing agent used is from 40 to 98.5%, and preferably from 50 to 90%.

In addition, the toner of the present invention preferably has an agglomeration degree of from 5 to 70%, and more preferably from 15 to 40%. When the agglomeration degree is too low, the toner tends to be scattered from a developing roller and/or the resultant toner images have background fouling. In contrast, when the agglomeration degree is too high, the fluidity of the toner deteriorates. Therefore, for example, when an image having a large image area and an image a small image area are alternately produced repeatedly, the toner cannot be sufficiently supplied to a developing roller, resulting in formation of images having uneven image density.

The method for measuring the agglomeration degree is as follows:

(1) A powder tester manufactured by Hosokawa Micron Co., Ltd. is used as the instrument. The following parts are set on a vibrating table of the tester in the following order.

1) vibroshoot
2) packing
3) space ring
4) screens (No.1 (upper), No.2 and No.3 (lower))
5) press bar (2) Then the parts are fixed using knob nuts.

(3) A toner sample is supplied to the upper screen.

(4) The vibration table is vibrated to sieve the toner.

(5) The weight of the toner on each of the screens.

The measuring conditions are as follows:

| | |
|---|---|
| 1) Opening of screens: | 75 μm (No. 1) (upper screen) |
| | 45 μm (No. 2) |
| | 22 μm (No. 3) (lower screen) |
| 2) vibrating width: | 1 mm |
| 3) weight of sample: | 2 grams |
| 4) vibrating time: | 15 seconds |

When the weights of the toner on No. 1, No. 2 and No.3 screens are w1, w2 and w3 grams, respectively, the agglomeration degree can be determined by the following equation:

$$\text{Agglomeration degree } (\%) = (w1/2) \times 100 + (w2/2) \times 60 + (w3/2) \times 20$$

In the present invention, another particulate inorganic material (hereinafter referred to as a second inorganic particulate material), which is not subjected to the surface treatment mentioned above or which is treated with a hydrophobizing agent other than the hydrophobizing agents used for the external additive of the present invention, may be included in the toner together with the external additive of the present invention.

Specific examples of such hydrophobizing agents for use in the second inorganic particulate material include silane coupling agents, silylation agents, silane coupling agents having a fluorinated alkyl group, organic titanate coupling agents, aluminum coupling agents and the like compounds.

The second inorganic particulate material preferably has an average particle diameter less than that of the first inorganic particulate material mentioned above for use in the external additive of the present invention. By adding such a second inorganic particulate material, the coverage of the surface of the toner is increased, and thereby good fluidity can be imparted to the toner. Therefore, the resultant toner images have good image reproducibility, and good image density. In addition, aggregation and solidification of toner particles can be avoided when the toner is preserved. The content of the second inorganic particulate material in the toner is preferably from 0.01 to 5% by weight, and preferably 0.1 to 2% by weight.

In addition, the toner of the present invention preferably includes a particulate resin, which serves as a third external additive, together with the external additive of the present invention to reduce toner particles having a reverse charge (i.e., to uniformly charge the toner particles). Therefore, background fouling can be prevented. The average particle diameter of the particulate resin is preferably greater than that of the particulate inorganic material in the external additive of the present invention. The addition quantity of the particulate resin is 0.01 to 5% by weight, and preferably from 0.1 to 2% by weight, of the toner.

Specific examples of such particulate resins include polymers such as polystyrene, polymethacrylate and polyacrylate and their copolymers; polycondensation polymers such as silicone resins, benzoguanamine resins and nylon resins; and thermosetting resins, etc. The particulate resins can be prepared by a method such as soap-free emulsion polymerization methods, suspension polymerization methods and dispersion polymerization methods.

The toner of the present invention may include the first, second and third external additives.

The toner of the present invention is a toner including toner particles, which have a volume average particle diameter not greater than 15 μm and include at least a binder resin and a colorant, and the external additive of the present invention which is mixed with the toner particles.

With respect to the constituents and manufacturing method of the toner of the present invention, known materials and manufacturing methods can be used.

Specific examples of the binder resin for use in the toner of the present invention include styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl .-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutyl methacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

Further the binder resin preferably includes a polyol resin having a polyoxyalkylene moiety in its main chain. The polyol resin is preferably a reaction product of: (a) an epoxy resin; (b) a dihydric phenol; and either (c) an adduct of a dihydric phenol with an alkylene oxide or (c') a glycidyl ether of an adduct of a dihydric phenol with an alkylene oxide.

The epoxy resin is preferably a reaction product of a bisphenol such as bisphenol A and bisphenol F with epichlorohydrin. As the divalent group, bisphenol A, bisphenol F, etc are exemplified.

Specific examples of the adduct of a dihydric phenol with an alkylene oxide include reaction products of ethylene oxide, propylene oxide, butylene oxide or their mixture with a bisphenol such as bisphenol A or bisphenol F. These reaction products can be further reacted with epichlorohydrin or •-methylepichlorohydrin to produce their glycidyl ether compounds.

In addition, the reaction products may be reacted with a monohydric phenol such as phenol, cresol, isopropylphenol, aminophenol, octylphenol, nonylphenol, dodecylphenol and p-cumylphenol.

Suitable colorants include known dyes and pigments. Specific examples of the colorants include carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and the like. These materials are used alone or in combination.

The content of the colorant in the toner is preferably from 0.1 to 50 parts by weight per 100 parts by weight of the binder resin included in the toner.

The toners of the present invention may include a charge controlling agent, if desired. Specific examples of the charge controlling agent include known charge controlling agents such as Nigrosine dyes, triphenylmethane dyes, metal complex dyes including chromium, chelate compounds of molybdic acid, Rhodamine dyes, alkoxyamines, quaternary ammonium salts (including fluorine-modified quaternary ammonium salts), alkylamides, phosphor and compounds including phosphor, tungsten and compounds including tungsten, activators including fluorine, metal salts of salicylic acid, salicylic acid derivatives, etc.

Specific examples of the marketed products of the charge controlling agents include Bontron 03 (Nigrosine dyes), BONTRON P-51 (quaternary ammonium salt), BONTRON S-34 (metal-containing azo dye), E-82 (metal complex of oxynaphthoic acid), E-84 (metal complex of salicylic acid), and E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and NX VP434 (quaternary ammonium salt), which are manufactured by Hoechst AG; LRA-901, and LR-147 (boron complex), which are manufactured by Japan Carlit Co., Ltd.; copper phthalocyanine, perylene, quinacridone, azo pigments and polymers having a functional group such as a sulfonate group, a carboxyl group, a quaternary ammonium group and the like; etc.

The content of the charge controlling agent in the toner of the present invention depends on the species of the binder resin used, whether other additives are present, and the method for manufacturing the toner. In general, the content is from 0.1 to 10 parts by weight, and preferably from 2 to 5 parts by weight, per 100 parts by weight of the binder resin included in the toner.

When the content is too high, the resultant toner has too high a charge and therefore the electrostatic attraction between the toner and a developing roller increases, resulting in deterioration of fluidity of the toner (i.e., developer) and decrease of image density of the resultant images.

The toner preferably includes a wax to improve the releasability thereof. Suitable waxes for use in the toner include waxes having a melting point of from 40 to 120° and preferably from 50 to 110°. When the melting point of the wax included in the toner is too high, the low temperature fixability of the resultant toner deteriorates. To the contrary, when the melting point is too low, the offset resistance and durability of the resultant toner deteriorate.

The melting point of waxes can be determined by a method using a differential scanning calorimeter (i.e., DSC). Namely, a few milligrams of a sample is heated at a constant heating speed (for example, 10°/min) to determine the temperature at which the sample melts (i.e., a peak of the sample due to melting of the sample is observed).

Specific examples of the waxes include solid paraffin waxes, microcrystalline waxes, rice waxes, fatty acid amide waxes, fatty acid waxes, aliphatic monoketones, fatty acid metal salt waxes, fatty acid ester waxes, partially-saponified fatty acid ester waxes, silicone varnishes, higher alcohols, carnauba waxes, polyolefins such as low molecular weight polyethylene and polypropylene, and the like waxes. In particular, polyolefins having a softening point of from 70 to 150°, and preferably from 120 to 150°, which is determined by a ring and ball method, are preferable.

The toner may include a cleanability improving agent which can improve the cleaning property of the toner when remaining on the surface of an image bearing member such as a photoreceptor even after a toner image is transferred. Specific examples of such a cleanability improving agent include fatty acids and their metal salts such as stearic acid, zinc stearate, and calcium stearate; and particulate polymers such as polymethylmethacrylate and polystyrene, which are manufactured by a method such as soap-free emulsion polymerization methods.

Particulate resins having a relatively narrow particle diameter distribution and a volume average particle diameter of from 0.01 to 1 $\mu$m are preferably used in the toner of the present invention.

Then the method of preparing the toner of the present invention will be explained.

The toner of the present invention is typically prepared by the following method:

(1) toner constituents including at least a binder resin, a main charge controlling agent and a pigment are mechanically mixed (mixing process);

(2) the toner constituents are kneaded while heated (kneading process);

(3) the kneaded mixture is cooled and then pulverized to form a color powder (pulverizing process); and (4) the color powder is classified to prepare a mother toner (classifying process).

The color powder having an undesired particle diameter (hereinafter referred to as a by-product) may be reused for the mixing and kneading processes. When the by-product is re-used, the mixing ratio of the by-product to the new raw materials is preferably 1/99 to 50/50 by weight.

The procedure for the mixing process is not particularly limited, and the toner constituents are merely mixed mechanically using a known mixer having a rotating blade.

In the kneading process following the mixing process, the mixture is contained in a kneader and then kneaded upon application of heat. Suitable kneaders include the kneaders include single-axis or double-axis continuous kneaders and batch kneaders such as roll mills. Specific examples of the kneaders include KTK double-axis extruders manufactured by Kobe Steel, Ltd., TEM extruders manufactured by Toshiba Machine Co., Ltd., double-axis extruders manufactured by KCK Co., Ltd., PCM double-axis extruders manufactured by Ikegai Corp., and KO-KNEADER manufactured by Buss AG.

In the kneading process, it is important to control the kneading conditions so as not to cut the molecular chains of the binder resin used in the toner. Specifically, when the mixture is kneaded at a temperature much lower than the softening point of the binder resin used, the molecular chains of the binder resin tend to be cut. When the kneading temperature is too high, the pigment in the mixture cannot be fully dispersed.

In the pulverizing process, it is preferable that the kneaded mixture is at first crushed to prepare coarse particles (hereinafter referred to as a crushing step) and then the coarse particles are pulverized to prepare fine particles (hereinafter referred to as a pulverizing step). In the pulverizing step, a pulverizing method in which coarse particles are pulverized by being collided against a collision plate by jet air or a pulverizing method in which coarse particles are pulverized at a narrow gap between a mechanically-rotating rotor and a stator is preferably used.

In the classifying process, the color powder is air-classified using centrifugal force to obtain toner particles (i.e., a mother toner) having a predetermined average particle diameter (for example, from 5 to 15 $\mu$m).

Then the mother toner is mixed with the external additive of the present invention to improve fluidity, developing properties and transferring properties using a mixer.

Suitable mixers include known mixers for mixing powders, which preferably have a jacket to control the inside temperature thereof.

By changing the timing when the external additive is added or the addition speed of the external additive, the stress on the external additive (i.e., the adhesion state of the external additive with the mother toner particles) can be changed. Of course, by changing rotating number of the blade of the mixer used, mixing time, mixing temperature, etc., the stress can also be changed.

In addition, a mixing method in which at first a relatively high stress is applied and then a relatively low stress is applied to the external additive, or vice versa, can also be used.

Specific examples of the mixers include V-form mixers, locking mixers, Loedge Mixers, Nauter Mixers, Henshel Mixers and the like mixers.

When the toner of the present invention is used as a two-component developer in which the toner is mixed with a magnetic carrier. The weight ratio of the toner to the carrier is preferably from 1/100 to 10/100.

Suitable carriers for use in the two component developer include known carrier materials such as iron powders, ferrite powders, magnetite powders, magnetic resin carriers, which have a particle diameter of from 20 to 200 $\mu$m. The surface of the carriers may be coated with a resin.

Specific examples of such resins include amino resins such as urea-formaldehyde resins, melamine resins, benzoguanamine resins, urea resins, and polyamide resins, and epoxy resins. In addition, vinyl or vinylidene resins such as acrylic resins, polymethylmethacrylate resins, polyacrylonitirile resins, polyvinyl acetate resins, polyvinyl alcohol resins, polyvinyl butyral resins, polystyrene resins, styrene-acrylic copolymers, halogenated olefin resins such as polyvinyl chloride resins, polyester resins such as polyethyleneterephthalate resins and polybutyleneterephthalate resins, polycarbonate resins, polyethylene resins, polyvinyl fluoride resins, polyvinylidene fluoride resins, polytrifluoroethylene resins, polyhexafluoropropylene resins, vinylidenefluoride-acrylate copolymers, vinylidenefluoride-vinylfluoride copolymers, copolymers of tetrafluoroethylene, vinylidene-fluoride and other monomers including no fluorine atom, and silicone resins.

If desired, an electroconductive powder may be included in the toner. Specific examples of such electroconductive powders include metal powders, carbon blacks, titanium oxide, tin oxide, and zinc oxide. The average particle diameter of such electroconductive powders is preferably not greater than 1 $\mu$m. When the particle diameter is too large, it is hard to control the resistance of the resultant toner.

The toner of the present invention can also be used as a one-component magnetic developer including a magnetic material in the toner, or a one-component non-magnetic developer.

Figure 8:
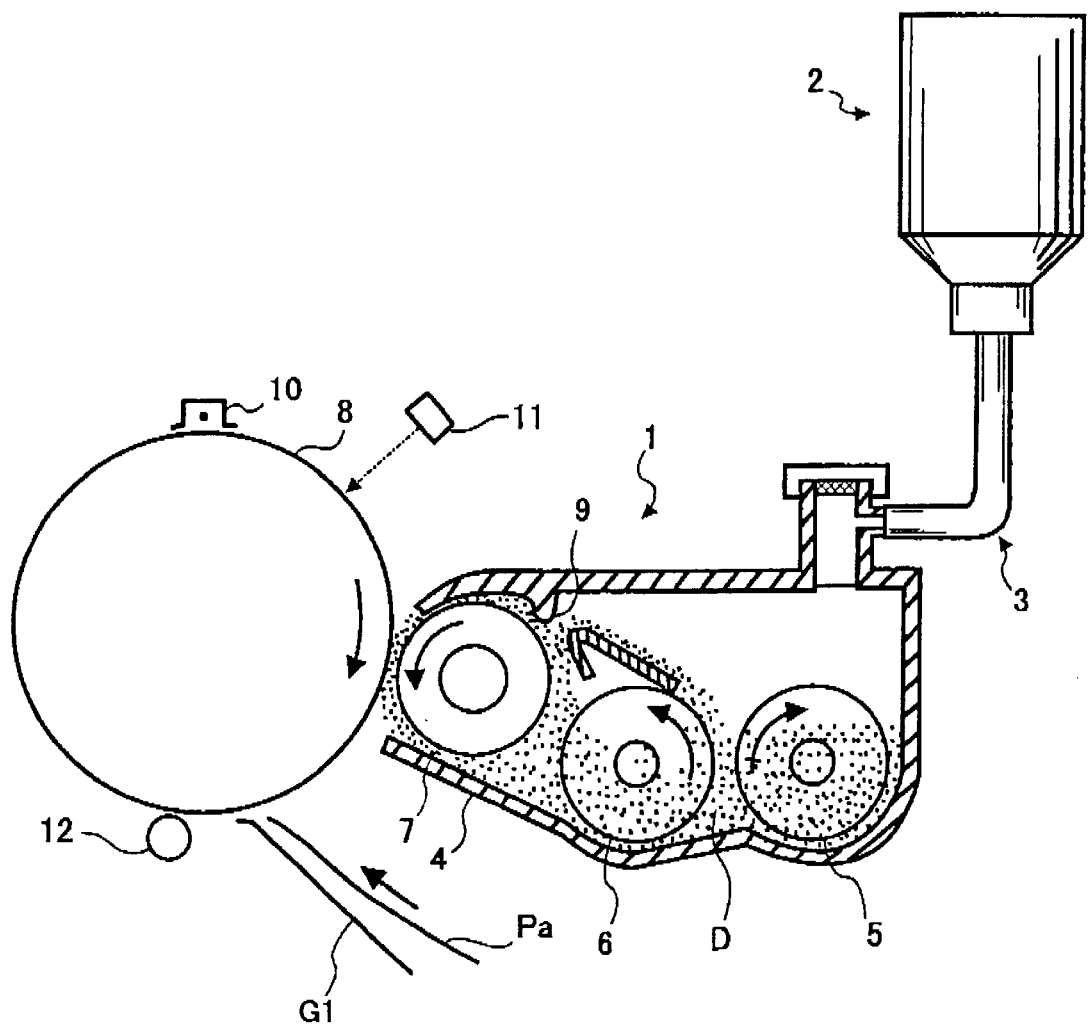
FIG. 8 is a schematic view illustrating a main part of another embodiment of the image forming apparatus of the present invention.

FIG. 8 is a schematic view illustrating a developing section of an embodiment of the image forming apparatus of the present invention.

In FIG. 8, numerals 1, 2 and 3 denote an image developer, a toner container 2 containing the toner of the present invention to be supplied and a toner feeder configured to feed the toner to the image developer 1, respectively.

The image developer 1 includes a housing 4 in which a developer D including a carrier and the toner of the present invention is contained, a first agitator 5, a second agitator 6 and a developing roller 7. The developing roller 7 faces a photoreceptor (i.e., an image bearing member) 8. The photoreceptor 8 is rotated in a direction as indicated by an arrow, and bears an electrostatic latent image on the surface thereof.

Around the photoreceptor 8, a charger 10, a light irradiator 11, and an image transfer device 12 are arranged. Other members such as a discharger configured to discharge the remaining charge on the photoreceptor 8, a cleaner configured to clean the surface of the photoreceptor 8, etc., which are not shown in FIG. 8, may be arranged around the photoreceptor 8.

The photoreceptor 8 is charged with the charger 10 and then exposed to imagewise light emitted by the light irradiator 11. Thus an electrostatic latent image is formed on the photoreceptor 8.

On the other hand, in the image developer 1 each of the agitators 5 and 6 rotates in a direction indicated by a respective arrow to agitate the developer D, and thereby the carrier and the toner are frictionally charged such that they have charges having different polarities. The thus charged developer D is supplied on the surface of the developing roller 7 and held thereon. Since the developing roller 7 rotates in a direction indicated by an arrow, the developer D on the developing roller 7 is regulated by a doctor blade 9 to form a thin layer of the developer D.

The thus formed developer layer is fed to the developing section at which the electrostatic latent image on the photoreceptor 8 is developed with the toner included in the developer layer, resulting in formation of a toner image on the photoreceptor 8.

Then the toner image formed on the photoreceptor 8 is transferred on a receiving material Pa, which is fed along a paper guide G1 in a direction as indicated by an arrow, by an image transfer device (i.e., a transfer roller) 12 which presses the receiving material Pa toward the photoreceptor 8, and then the toner image on the receiving material Pa is fixed with a fixer (not shown).

In this case, the developer may be a one-component developer of a two-component developer.

In addition, the toner image formed on the photoreceptor may be transferred onto the receiving material Pa via an intermediate transfer material (not shown).

The toner of the present invention can be preferably used for a full color image forming method using non-magnetic one component developer and an electroconductive brush. Specifically, by repeating an image forming operation using color toners in which a color image (such as yellow, magenta, cyan and black images) formed on an image bearing member is transferred on a receiving material, a full color image is formed on the receiving material. In this case, at least one of the color toners is the toner of the present invention. The resultant full color image has good halftone reproducibility.

In this full color image forming method, a developing device having plural developing sections for forming plural color toner images. Each of the developing sections has a developing roller configured to bear a developer layer thereon and a regulating blade configured to control the thickness of the developer layer. Electrostatic latent images, which correspond to the respective color images and which are formed on the image bearing member one by one, are developed by the developing sections, resulting in formation of color toner images on the image bearing member one by one. The color toner image is transferred on a receiving material one by one to form a full color image. The electrostatic latent images can be formed by, for example, charging a photoreceptor (i.e., image bearing member) with a charger using an electroconductive brush and then irradiating the photoreceptor with imagewise light.

The color toner images may be transferred on an intermediate transfer medium to form a full color image thereon. The full color image is then transferred on a receiving material.

Figure 7:
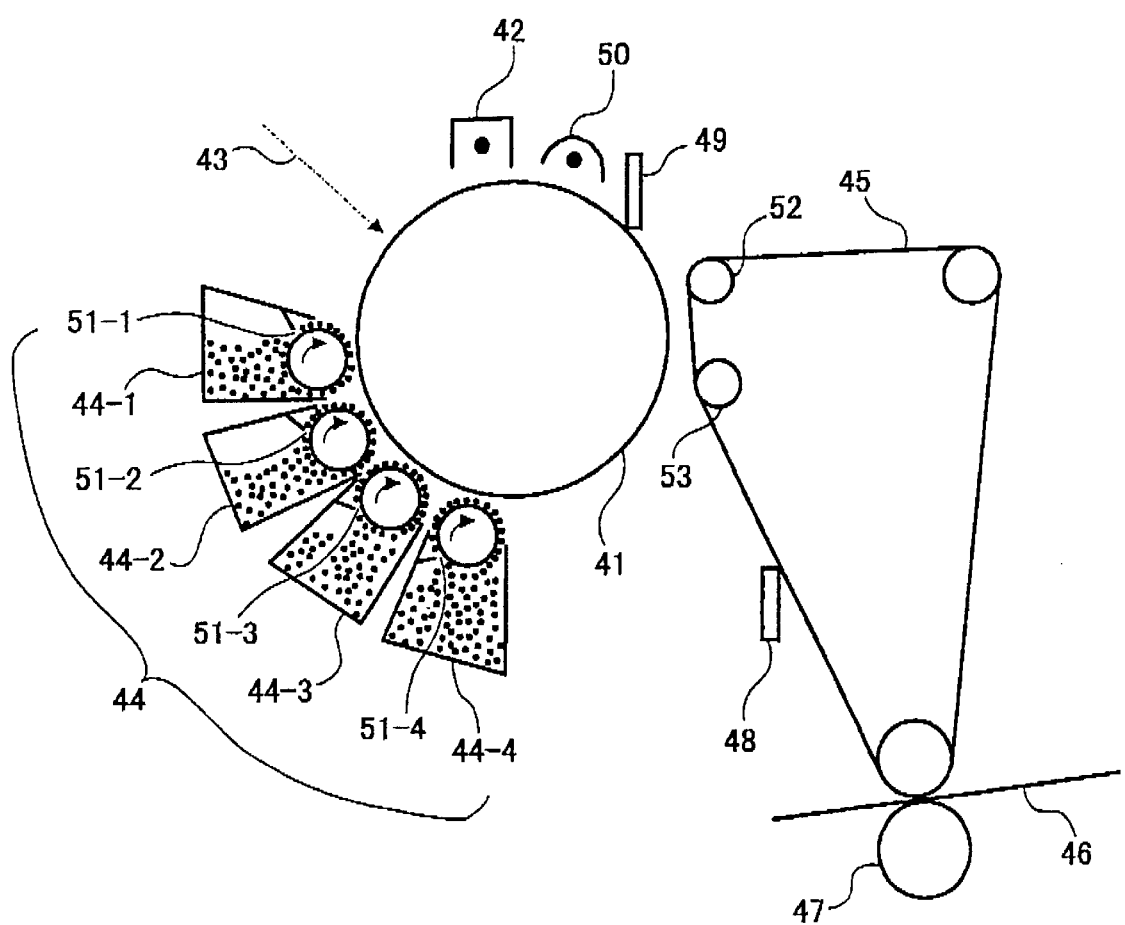
FIG. 7 is a schematic view illustrating a main part of an embodiment of the image forming apparatus of the present invention.

FIG. 7 is a schematic view illustrating another embodiment of the image forming apparatus of the present invention. A photoreceptor 41 is charge by a charger 42 such that the surface of the photoreceptor 41 is entirely charged. The photoreceptor 41 is then exposed to imagewise light 43 to form an electrostatic latent image thereon. The electrostatic latent image is then developed by one of developing sections 44-1 of an image developer 44 to form a color toner image on the photoreceptor 41. The color toner image is then transferred on an intermediate transfer medium 45 while the rotating intermediate transfer medium 45 is contacted with the color toner image by rollers 52 and 53. The surface of the photoreceptor 41 is cleaned by a cleaner 49 to remove toner particles remaining on the surface of the photoreceptor 41. Then a discharging lamp 50 irradiates the photoreceptor 41 with light to remove the charge remaining on the photoreceptor 41.

The another color toner image is formed on the photoreceptor 41 by repeating the above-mentioned procedure except that a developing section 44-2 including a different color developer is used. The thus prepared color toner image is then transferred on the previously formed color image on the intermediate transfer medium 45. Similarly, other color toner images formed using developing sections 44-3 and 44-4 are formed on the photoreceptor 41 one by one. The color toner images are also transferred on the color images on the intermediate transfer medium 45. Thus a color image (for example, a full color image) is formed on the intermediate transfer medium 45.

The color image formed on the intermediate transfer medium 45 is then transferred on a receiving material 46 at once by a transfer roller 47. The intermediate transfer medium 45 is cleaned by a cleaner 48.

Numerals 51-1, 51-2, 51-3 and 51-4 denote regulating blades configured to form a layer of each developer on the respective developing roller.

In the full color image forming method, plural image bearing members may be used to form the respective color toner image thereon. The plural color toner images are transferred on an intermediate transfer medium or a receiving material.

Figure 9:
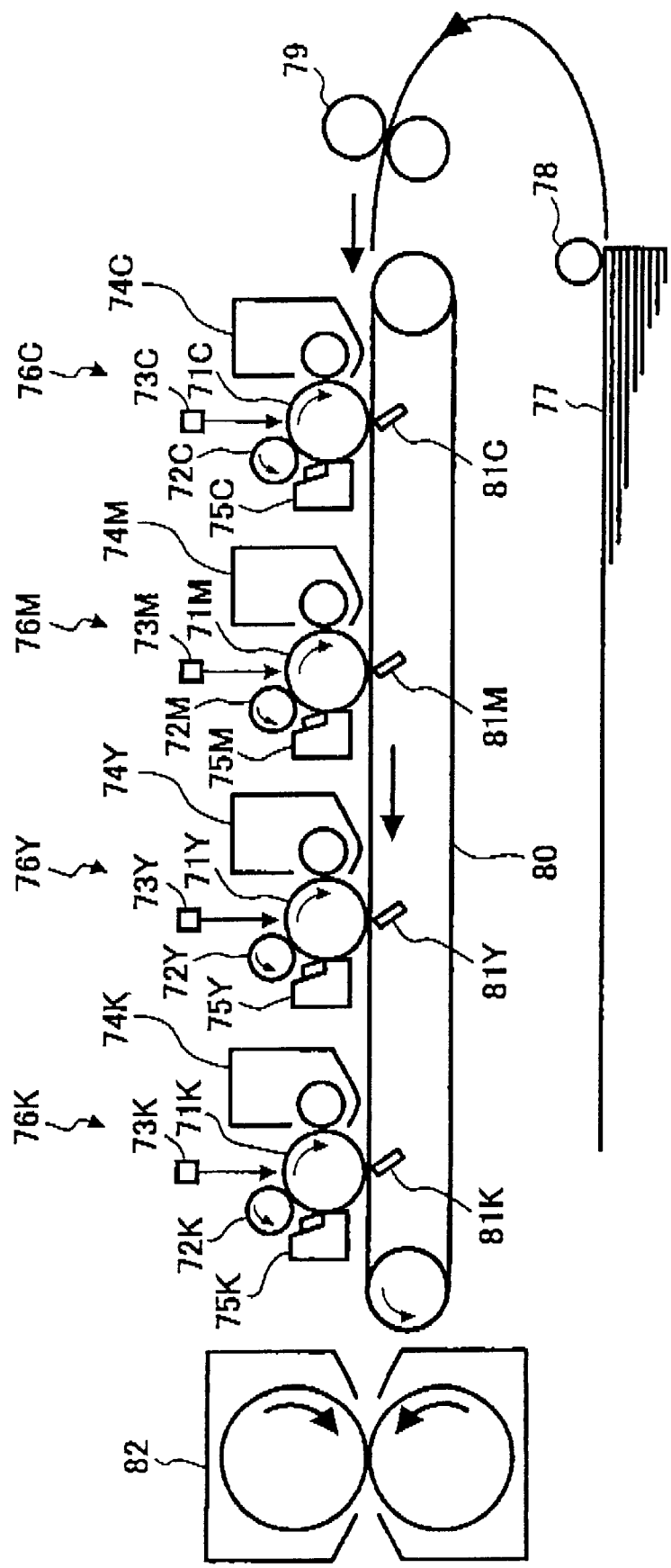
FIG. 9 is a schematic view illustrating a main part of yet another embodiment of the image forming apparatus of the present invention.

FIG. 9 is a schematic view illustrating an embodiment of the tandem type image forming apparatus of the present invention. However, the tandem type image forming apparatus of the present invention is not limited thereto.

In FIG. 9, the tandem type image forming apparatus has a cyan image forming unit 76C, a magenta image forming unit 76M, a yellow image forming unit 76Y and a black image forming unit 76K. Drum photoreceptors 71C, 71M, 71Y and 71K rotate in the direction indicated by the respective arrow. Around the photoreceptors 71C, 71M, 71Y and 71K, chargers 72C, 72M, 72Y and 72K, image developers 74C, 74M, 74Y and 74K, and cleaners 75C, 75M, 75Y and 75K are arranged in this order in the clockwise direction. As the chargers, known chargers can be used but contact chargers such as roller chargers and brush chargers are preferably used. Imagewise light irradiators 73C, 73M, 73Y and 73K irradiate with laser light a surface point of the respective photoreceptors located between the chargers and the image developers to form an electrostatic latent image on the respective photoreceptor. The four image forming units 76C, 76M, 76Y and 76K are arranged along a transfer belt 80. The transfer belt 80 contacts the respective photoreceptor 71C, 71M, 71Y or 71K at an image transfer point located between the respective image developer and the respective cleaner to receive color images formed on the photoreceptors. At the backside of each image transfer point of the transfer belt 80, transfer brushes 81C, 81M, 81Y and 81K are arranged to apply a transfer bias to the transfer belt 80.

The above-mentioned tandem type image forming apparatus can transfer plural color images at the same time, and therefore full color images can be produced at a high speed.

In the developing process, a reverse developing method is preferably used in which an electrostatic latent image is developed with a developer having a charge whose polarity is the same as that of the electrostatic latent image.

In addition, it is preferable that an electrostatic latent image on a photoreceptor is developed with a developer on the developing roller while the developer directly contacts the photoreceptor and the developing roller is rotated at a speed higher than that of the photoreceptor.

When the toner of the present invention is used for image forming apparatus having a corotron transfer device, the transferability of toner images can be improved. However, the effect of the toner can be fully exerted when the toner is used for image forming apparatus in which toner images are transferred from an image bearing member to a receiving material while transfer means such as a transfer roller presses the receiving material toward the image bearing member.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

Preparation of External Additive

The following components were mixed to dissolve polydimethyl siloxane in toluene.

Polydimethyl siloxane

3

(manufactured by Shin-Etsu Chemical Co., Ltd., and having a viscosity of 350 cs)

Toluene

100

Thirty (30) parts of a silica OX-50 manufactured by Nippon Aerosil Co. and having an average primary particle diameter of 40 nm was gradually added into the solution and dispersed while agitating and irradiating the mixture with ultrasonic waves.

After it was visually confirmed that there was no agglomerated particles of the silica in the dispersion, the dispersion was decompressed to 10 mmHg using a rotary evaporator to remove toluene therefrom. The thus prepared solid was then dried at 50° under a reduced pressure using a decompression oven such that the weight of the residue did not change. Thus a silicone-coated silica was prepared. The thus prepared silicone-coated powder was subjected to a heat treatment at 200° for 2 hours in an electric furnace under nitrogen gas flow. Then the powder was dissociated (i.e., the agglomerated powder was released) using a jet mill and then collected by a bag filter. The average primary particle diameter of the silicone-coated was not changed (i.e., 40 nm).

The external additive was prepared while changing the conditions of the dispersion operation in the hydrophobizing treatment, the heat treatment conditions, etc. such that a compound having an organopolysiloxane structure remains in the external additive treated with chloroform when the external additive washed with chloroform was analyzed by the Py-GCMS analysis mentioned above.

Preparation of Black Mother Toner

The following components were mixed and agitated in a flasher.

Water

1200

Phthalocyanine Green aqueous cake

200

(solid content of 30%)

Carbon black

540

(Tradenamed as MA60 and manufactured by Mitsubishi Chemical Corp.)

Then 1200 parts of an epoxypolyol resin having a number average molecular weight Mn of 3800, a ratio Mw/Mn of 3.9, and a glass transition temperature Tg of 59°) were added to the mixture, and kneaded at 150° for 30 minutes. Then 1000 parts of xylene were added thereto, and further kneaded for 1 hour. After water and xylene were removed therefrom, the residue was cooled by rolling and then pulverized by a pulverizer. Thus a black pigment master batch was prepared.

Then the following components were mixed.

The epoxypolyol resin mentioned above

100

The black pigment master batch       8

Charge controlling agent       2

(tradenamed as BONTRON E-84 and manufactured by Orient Chemical Industries Co., Ltd.)

The mixture was melted and kneaded by a two-roll mill. Then the mixture was cooled by rolling. The mixture was pulverized by a pulverizer (I TYPE MILL manufactured by Nippon Pneumatic Mfg. Co., Ltd.) which is a jet mill using a collision plate, and then the pulverized mixture was air-classified by a classifier (DS CLASSIFIER manufactured by Nippon Pneumatic Mfg. Co., Ltd.) which uses circling air.

Thus, a black mother toner having a volume average particle diameter of 8.5 μm was prepared.

Preparation of Yellow Mother Toner The following components were mixed and agitated in a flasher.

Water       600

Pigment Yellow 17 aqueous cake       1200

(solid content of 50%)

Then 1200 parts of the epoxypolyol resin mentioned above were added to the mixture, and kneaded at 150° for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a yellow pigment master batch was prepared.

Then the following components were mixed.

| The epoxypolyol resin mentioned above | 100 |
| The yellow pigment master batch prepared above | 8 |
| Charge controlling agent (BONTRON E-84) | 2 |

The mixture was melted and kneaded by a two-roll mill. Then the mixture was cooled by rolling. The mixture was pulverized and air-classified in the same way as performed in the black toner preparation process.

Thus, a yellow mother toner having a volume average particle diameter of 8.5 μm was prepared.

Preparation of Magenta Mother Toner

The following components were mixed and agitated in a flasher.

Water       600

Pigment Red 57 aqueous cake       1200

(solid content of 50%)

Then 1200 parts of the epoxypolyol resin mentioned above were added to the mixture, and kneaded at 150° for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a magenta pigment master batch was prepared.

Then the following components were mixed.

| The epoxypolyol resin mentioned above | 100 |
| The magenta pigment master batch prepared above | 8 |
| Charge controlling agent (Bontron E-84) | 2 |

The mixture was melted and kneaded by a two-roll mill. Then the mixture was cooled by rolling. The mixture was pulverized and air-classified in the same way as performed in the black toner preparation process.

Thus, a magenta mother toner having a weight average particle diameter of 8.5 μm was prepared.

Preparation of Cyan Mother Toner

The following components were mixed and agitated in a flasher.

Water       600

Pigment Blue 15:3 aqueous cake       1200

(solid content of 50%)

Then 1200 parts of the epoxypolyol resin mentioned above were added to the mixture, and kneaded at 150° for 30 minutes. Then 1000 parts of xylene were added thereto, and further kneaded for 1 hour. After water and xylene were removed therefrom, the residue was cooled by rolling and then pulverized by a pulverizer. Then the powder was kneaded twice by a three-roll mill. Thus a cyan pigment master batch was prepared.

Then the following components were mixed.

| The epoxypolol resin mentioned above | 100 |
| The cyan pigment master batch prepared above | 8 |
| Charge controlling agent (Bontron E-84) | 2 |

The mixture was melted and kneaded by a two-roll mill. Then the mixture was cooled by rolling. The mixture was pulverized and air-classified in the same way as performed in the black toner preparation process.

Thus, a cyan mother toner having a weight average particle diameter of 8.5 μm was prepared.

Preparation of Color Toners

One hundred (100) parts of each of the above-prepared four mother toners were mixed with 1.0 part of the external additive prepared above using a Henshel mixer. The mixture was sieved using a screen having openings of 50 μm to remove coarse particles.

Thus, four color toners of Example 1 were prepared.

When these toners were evaluated as two-component developers, the toners were mixed with a ferrite carrier having an average particle diameter of 50 μm and coated with a silicone resin such that the thickness of the coated layer was 0.3 μm. Then 100 parts of the carrier were mixed with 5 parts of each color toner using a TURBULA mixer to prepare four color developers.

The thus prepared four color developers were set in a full color laser copier (modified IMAGIO COLOR 2800 manufactured by Ricoh Co., Ltd.) having a construction as shown in FIG. 7. This copier uses a reverse developing method in which the polarity of the electrostatic latent image is the same as that of charge of the developer (the tow-component developer).

Example 2

The procedure for preparation of the color toners in Example 1 was repeated except that the heat treatment of the hydrophobizing treatment of the external additive was performed at 190° for 2 hours. The average primary particle diameter of the external additive was the same as that of the silica.

Thus, four color toners of Example 2 were prepared. The color toners were also evaluated by the evaluation method mentioned above.

Example 3

The procedure for preparation of the color toners in Example 1 was repeated except that the hydrophobizing agent was changed to polydimethylsiloxane having a viscosity of 450 as manufactured by Shin-Etsu Chemical Co., Ltd. and the heat treatment of the hydrophobizing treatment was performed at 210° for 1.5 hours such that a compound having formula (2) mentioned above (in this case, n is not less than 3) was included in the components produced by heat-decomposing the external additive washed with chloroform. The average primary particle diameter of the external additive was the same as that of the silica.

Thus, four color toners of Example 3 were prepared. The color toners were also evaluated by the evaluation method mentioned above.

The Py-GCMS chromatogram of the external additive washed with chloroform is shown in FIG. 1.

Example 4

The procedure for preparation of the color toners in Example 1 was repeated except that the hydrophobizing agent was changed to polydimethylsiloxane having a viscosity of 200 cs manufactured by Shin-Etsu Chemical Co., Ltd. and the heat treatment of the hydrophobizing treatment was performed at 200° for 2.5 hours such that a compound having formula (2) mentioned above (in this case, n is not less than 4) was included in the components produced by heat-decomposing the external additive washed with chloroform. The average primary particle diameter of the external additive was the same as that of the silica.

Thus, four color toners of Example 4 were prepared. The color toners were also evaluated by the evaluation method mentioned above.

Figure 2:
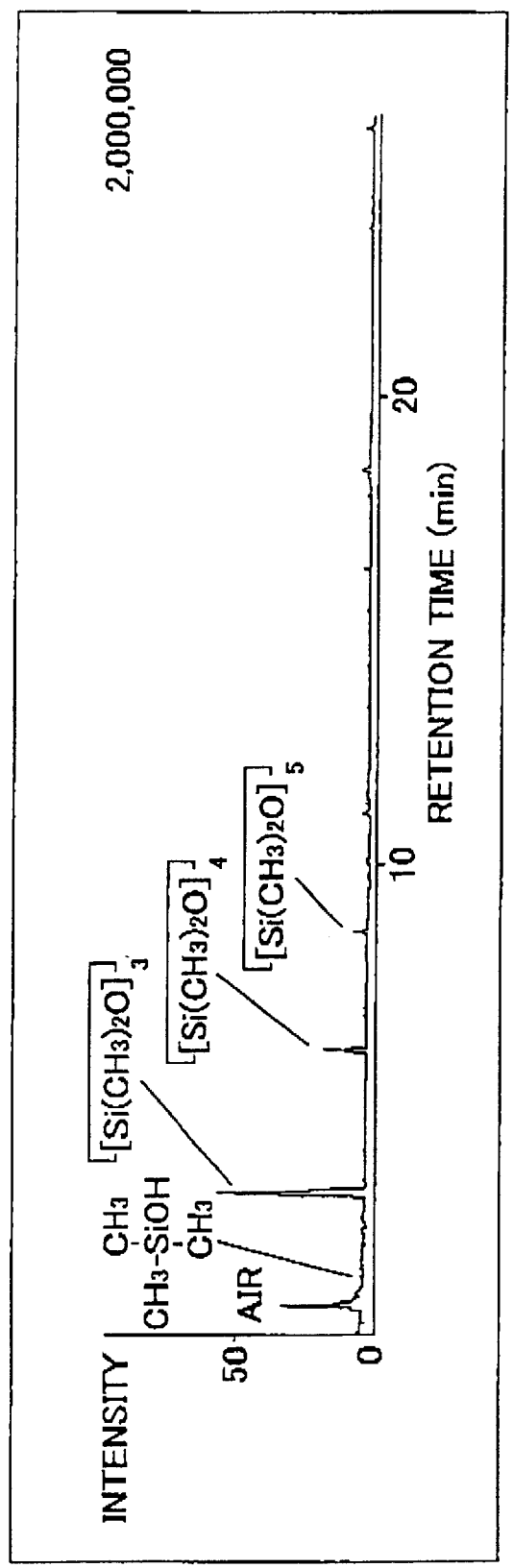
FIG. 2 is a chromatogram of Py-GCMS of compounds present on the inorganic particulate material after the external additive of Example 4 is washed by chloroform.

The Py-GCMS chromatogram of the external additive washed with chloroform is shown in FIG. 2.

Example 5

The procedure for preparation of the color toners in Example 1 was repeated except that the hydrophobizing agent (i.e., polydimethyl siloxane) was replaced with hexaethyldisilazane. The average primary particle diameter of the external additive was the same as that of the silica.

Thus, four color toners of Example 5 were prepared. The color toners were also evaluated by the evaluation method mentioned above.

Example 6

The procedure for preparation of the color toners in Example 1 was repeated except that the hydrophobizing agent (i.e., polydimethylsiloxane) was replaced with a silicone varnish. The average primary particle diameter of the external additive was the same as that of the silica.

Thus, four color toners of Example 6 were prepared. The color toners were also evaluated by the evaluation method mentioned above.

Example 7

The procedure for preparation of the color toners in Example 1 was repeated except that the addition quantity of polydimethylsiloxane was changed to 1.0 part and the heat treatment after the hydrophobizing treatment was not performed. The average primary particle diameter of the external additive was the same as that of the silica.

Thus, four color toners of Example 7 were prepared. The color toners were also evaluated by the evaluation method mentioned above.

Example 8

The procedure for preparation of the color toners in Example 1 was repeated except that the inorganic particulate material (i.e., the silica OX-50) of the external additive was replaced with titanium oxide (TAF110A from Fuji Titanium Industry Co., Ltd.) having an average primary particle diameter of 50 nm. The average primary particle diameter of the external additive was the same as that of the titanium oxide (i.e., 50 nm).

Thus, four color toners of Example 8 were prepared. The color toners were also evaluated by the evaluation method mentioned above.

Example 9

The procedure for preparation of the color toners in Example 1 was repeated except that the inorganic particulate material (i.e., the silica OX-50) of the external additive was replaced with alumina (AL OXIDE-C manufactured by Nippon Aerosil Co.) having an average primary particle diameter of 13 nm. The average primary particle diameter of the external additive was the same as that of the alumina (i.e., 13 nm).

Thus, four color toners of Example 9 were prepared. The color toners were also evaluated by the evaluation method mentioned above.

Example 10

The procedure for preparation of the color toners in Example 1 was repeated except that each of the color toners was prepared as follows:

The following components were mixed with a Henshel mixer.

| | |
|---|---|
| Silica OX-50 hydrophobized by hexamethyldisilazzne | 1.0 |
| Color mother toner | 100 |
| Polydimethylsiloxane | 0.2 |
| (manufactured by Shin-Etsu Chemical Co., Ltd. and having a viscosity of 100 cs) | |

At first, the silica and polydimethylsiloxane were mixed at a rotating speed of 1800 rpm for 10 minutes and then color mother toner was added thereto such that a compound having a ring structure was included in the components produced by heat-decomposing the external additive washed with chloroform. The average primary particle diameter of the external additive was the same as that of the silica (i.e., 40 nm).

Thus, four color toners of Example 10 were prepared. The color toners were also evaluated by the evaluation method mentioned above.

Figure 3:
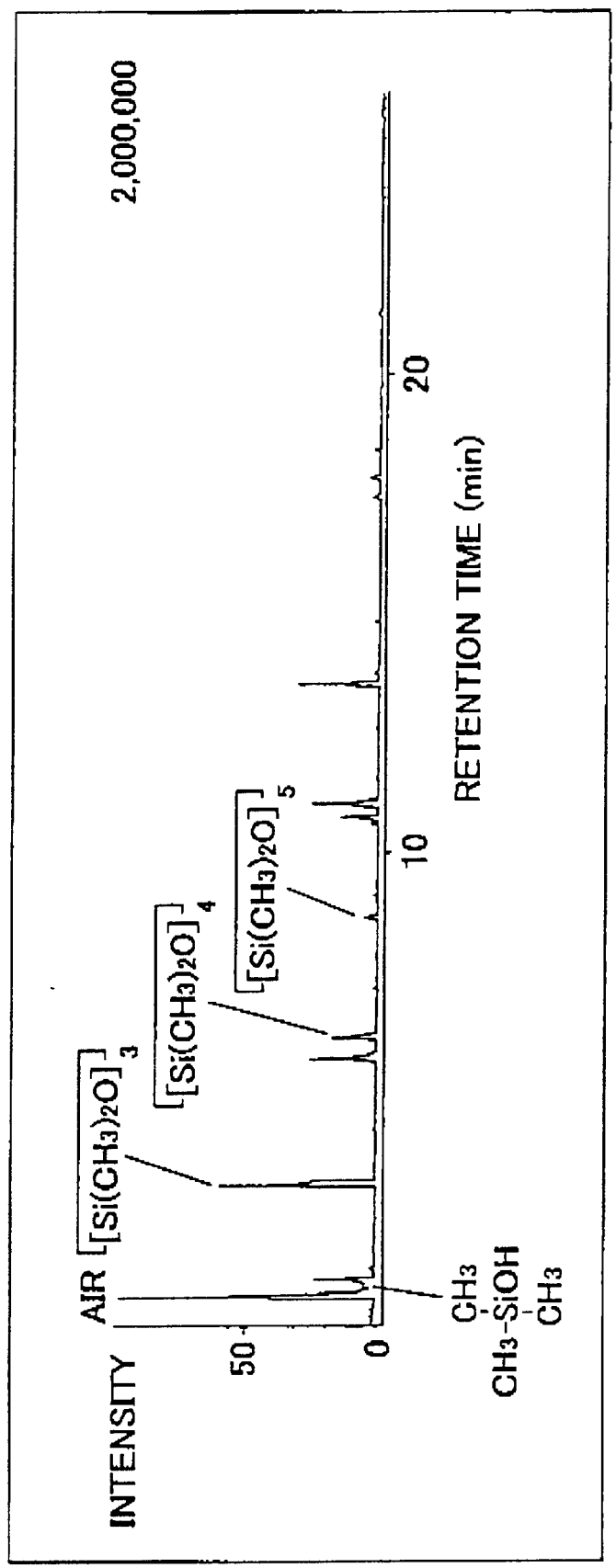
FIG. 3 is a chromatogram of Py-GCMS of compounds present on the inorganic particulate material after the toner of Example 10 is washed by chloroform.

The Py-GCMS chromatogram of the toner washed with chloroform is shown in FIG. 3.

Example 11

The procedure for preparation of the color toners in Example 1 was repeated except that 0.2 parts of a hydrophobic silica H2000 manufactured by Clariant Japan K.K. and having an average primary particle diameter of 10 nm were added as the second external additive.

Thus, four color toners of Example 11 were prepared. The color toners were also evaluated by the evaluation method mentioned above.

Example 12

The procedure for preparation of the color toners in Example 1 was repeated except that 0.2 parts of a hydrophobic silica H2000 manufactured by Clariant Japan K.K. and having an average primary particle diameter of 10 nm and 0.3 parts of a titanium oxide SMT-150AI manufactured by Tayca Corp. and having an average primary particle diameter of 15 nm were added as the second external additive.

Thus, four color toners of Example 12 were prepared. The color toners were also evaluated by the evaluation method mentioned above.

Example 13

The procedure for preparation of the color toners in Example 1 was repeated except that 0.5 parts of a particulate acrylic resin MP-1000 manufactured by Sohken Chemical Co., Ltd. and having an average particle diameter of 400 nm were added as the third external additive.

Thus, four color toners of Example 13 were prepared. The color toners were also evaluated by the evaluation method mentioned above.

Example 14

The procedure for preparation of the color toners in Example 1 was repeated except that that 0.5 parts of a hydrophobic silica H2000 manufactured by Clariant Japan K.K. were added as the second external additive and 0.5 parts of a particulate acrylic resin MP-1000 manufactured by Sohken Chemical Co., Ltd. and having an average particle diameter of 400 nm were added as the third external additive.

Thus, four color toners of Example 14 were prepared. The color toners were also evaluated by the evaluation method mentioned above.

Example 15

The color toners prepared in Example 1 were evaluated as non-magnetic one-component developers. The evaluation method was as follows:

Each of the non-magnetic color developer was set in a full color laser printer IPSIO 5000 manufactured by Ricoh Co., Ltd. In the printer, four color toner images were formed one by one on a belt-shaped photoreceptor using a developing device having four color developing sections. The developing method was a reverse developing method. The color toner images formed on the photoreceptor were transferred one by one to an intermediate transfer medium to form a full color image thereon. The full color image on the intermediate transfer medium was then transferred onto a receiving material.

Each of the developing sections has a developing roller formed of an elastic material and a stainless steel blade configured to form a developer layer (i.e., a layer of the non-magnetic one-component developer) on the developing roller.

Example 16

The color toners prepared in Example 1 were evaluated as non-magnetic one-component developers. The evaluation method was as follows:

The four color developers were set in a tandem type full color LED printer GL8300 manufactured by Fujitsu Ltd., having a construction as shown in FIG. 9. In the printer, four color toner images were formed on four drum-shaped photoreceptors, respectively, using an image developer having four color developing sections. The developing method was a reverse developing method. The color toner images were transferred one by one to an intermediate transfer medium to form a full color image thereon. The full color image was then transferred on a receiving material.

Each of the developing sections has a developing roller formed of an elastic material and a stainless steel blade configured to form a developer layer (i.e., a layer of the non-magnetic one-component developer) on the developing roller.

Comparative Example 1

The procedure for preparation of the color toners in Example 1 was repeated except that the average primary particle diameter of the inorganic particulate material of the external additive (i.e., silica OX-50) was changed to 150 nm. The average primary particle diameter of the external additive was the same as that of the inorganic particulate material (i.e., 150 nm).

Thus, four color toners of Comparative Example 1 were prepared. The color toners were also evaluated by the evaluation method mentioned above.

Comparative Example 2

The procedure for preparation of the color toners in Example 1 was repeated except that the specie of the hydrophobizing agent, and the conditions of the mixing process and heat treatment were changed such that the residual ratio of the hydrophobizing agent was changed from 65 to 35%.

Thus, four color toners of Comparative Example 2 were prepared. The color toners were also evaluated by the evaluation method mentioned above.

Comparative Example 3

The procedure for preparation of the color toners in Example 1 was repeated except that the specie of the hydrophobizing agent, and the conditions of the mixing process and heat treatment were changed such that the residual ratio of the hydrophobizing agent was changed from 65 to 99%.

Thus, four color toners of Comparative Example 3 were prepared. The color toners were also evaluated by the evaluation method mentioned above.

Comparative Example 4

The procedure for preparation of the color toners in Example 1 was repeated except that the heat treatment of the hydrophobizing treatment was performed at 120° for 1 hour so that a compound having formula (1) mentioned above (i.e., an organopolysiloxane structure) was not included in the external additive washed with chloroform.

Thus, four color toners of Example 4 were prepared. The color toners were also evaluated by the evaluation method mentioned above.

Comparative Example 5

The procedure for preparation of the color toners in Example 1 was repeated except that the heat treatment of the hydrophobizing treatment was performed at 120° for 1 hour so that a compound having formula (2) mentioned above was not included in the components produced by heat-decomposing the external additive washed with chloroform.

Thus, four color toners of Comparative Example 5 were prepared. The color toners were also evaluated by the evaluation method mentioned above.

Figure 4:
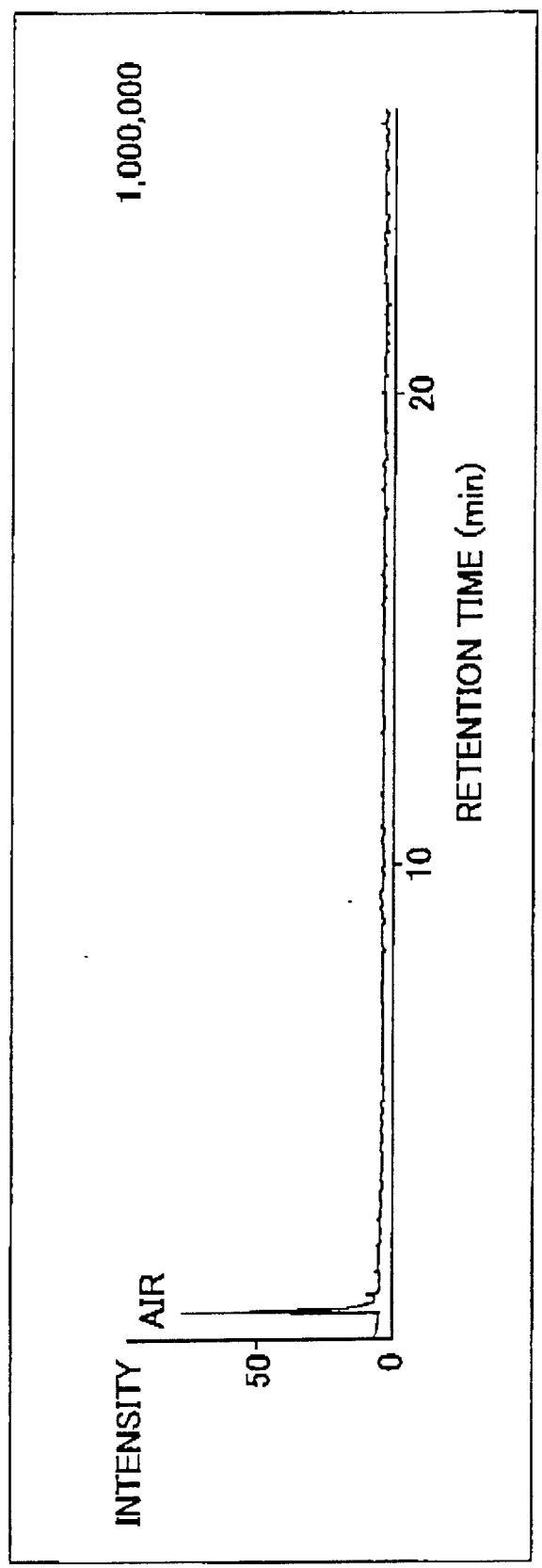
FIG. 4 is a chromatogram of Py-GCMS of compounds present on the inorganic particulate material after the external additive of Comparative Example 5 is washed by chloroform.

The Py-GCMS chromatogram of the residue prepared by treating the external additive with chloroform is shown in FIG. 4.

Comparative Example 6

The procedure for preparation of the color toners in Example 1 was repeated except that the heat treatment of the hydrophobizing treatment was performed at 110° for 1 hour and the hydrophobizing agent was changed to a polydimethylsiloxane having a viscosity of 250 as so that a compound having formula (2) mentioned above was not included in the components produced by heat-decomposing the external additive washed with chloroform.

Thus, four color toners of Comparative Example 6 were prepared. The color toners were also evaluated by the evaluation method mentioned above.

Figure 5:
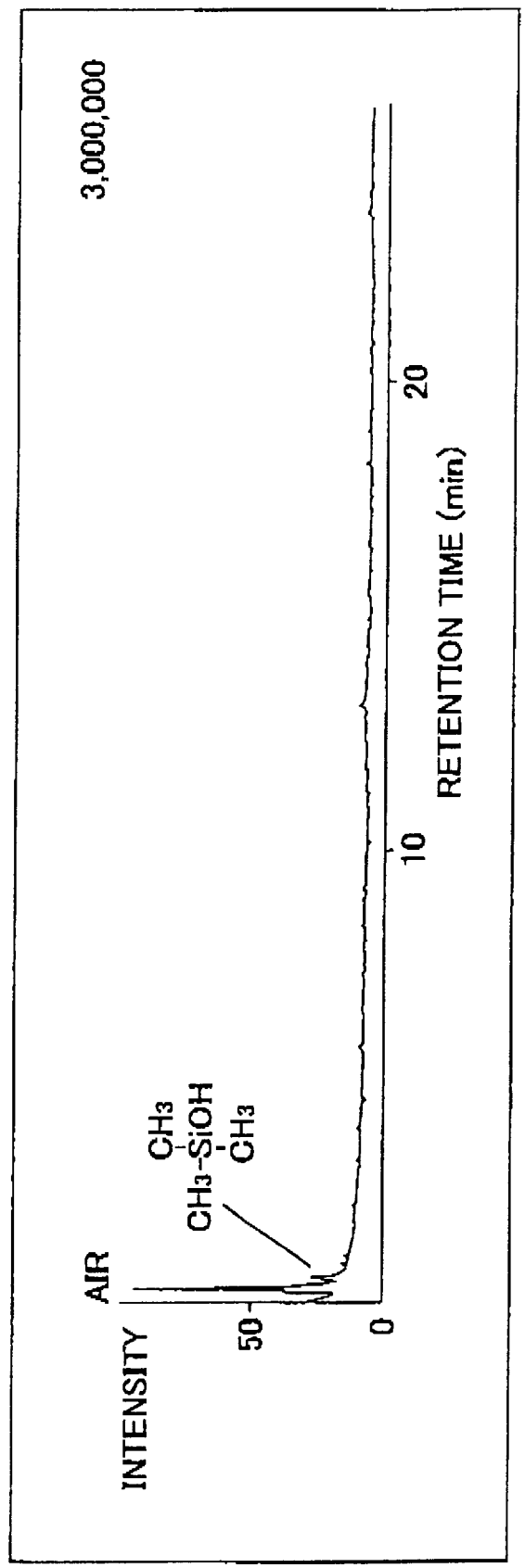
FIG. 5 is a chromatogram of Py-GCMS of compounds present on the inorganic particulate material after the external additive of Comparative Example 6 is washed by chloroform.

The Py-GCMS chromatogram of the residue prepared by treating the external additive with chloroform is shown in FIG. 5.

Comparative Example 7

The procedure for preparation of the color toners in Example 1 was repeated except that the heat treatment of the hydrophobizing treatment was performed at 100° for 0.5 hours and the hydrophobizing agent was changed to a polydimethylsiloxane having a viscosity of 450 cs so that a compound having formula (2) mentioned above was not included in the components produced by heat-decomposing the toner washed with chloroform.

Thus, four color toners of Comparative Example 7 were prepared. The color toners were also evaluated by the evaluation method mentioned above.

Figure 6:
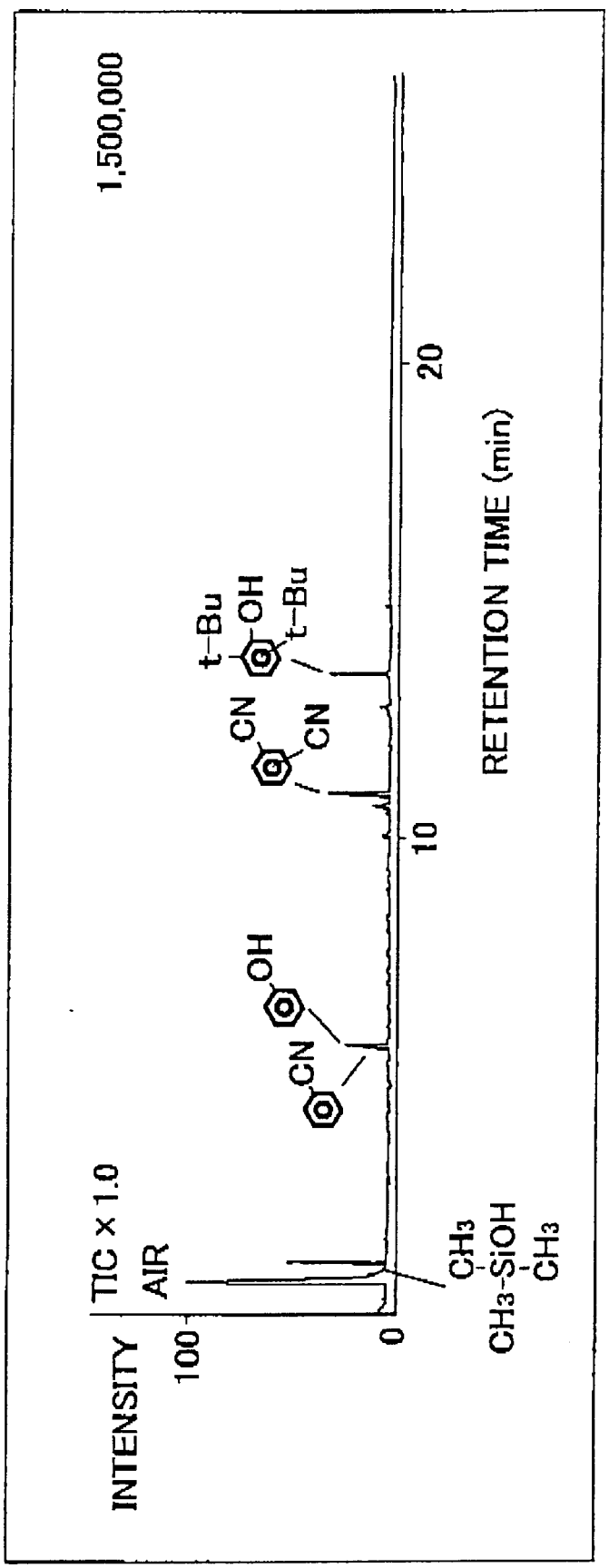
FIG. 6 is a chromatogram of Py-GCMS of compounds present on the inorganic particulate material after the toner of Comparative Example 7 is washed by chloroform.

The Py-GCMS chromatogram of the toner washed with chloroform is shown in FIG. 6.

Comparative Example 8

The procedure for preparation of the color toners in Example 1 was repeated except that the addition quantity of the hydrophobized silica was changed to 2.0, and agglomeration degree of the toner was changed from 42 to 73% by changing the mixing conditions.

Thus, four color toners of Comparative Example 8 were prepared. The color toners were also evaluated by the evaluation method mentioned above.

Comparative Example 9

The procedure for preparation of the color toners in Example 1 was repeated except that the addition quantity of the hydrophobized silica was changed to 0.3, and agglomeration degree of the toner was changed from 42 to 4% by changing the mixing conditions.

Thus, four color toners of Comparative Example 9 were prepared. The color toners were also evaluated by the evaluation method mentioned above.

Evaluation Method

Ninety-two thousand (92,000) copies of an image having an image area of 7% were produced. The evaluation items are as follows:

a) Image Density

The image densities of four color solid images formed on a receiving paper, TYPE 6000 manufactured by Ricoh Co., Ltd., was measured by a densitometer X-Rite manufactured by X-Rite Corp. The image densities were evaluated by being classified into the following four grades:

| | |
|---|---|
| • : 1.8 • | image density < 2.2 (excellent) |
| • : 1.4 • | image density < 1.8 |
| • : 1.2 • | image density < 1.4 |
| • : | image density < 1.2 (poor) | b) Background Fouling

A white image was formed on the photoreceptor. After the white image was developed, the photoreceptor was stopped before the transfer process. The developers adhered on the photoreceptor were transferred on an adhesive tape. The optical densities of the adhesive tape having the developer thereon and the adhesive tape itself (i.e., the adhesive tape without developers thereon) were measured by 938 SPECTRODENSITOMETOR manufactured by X-Rite Corp., to obtain the difference between the optical densities. The greater the difference, the worse the background fouling. The background fouling was evaluated by being classified into the following four grades.

| |
|---|
| • : Excellent (Optical density difference is small) |
| • : Good |
| • : Slightly poor |
| • : Poor (Optical density difference is large) | c) Reproducibility of Half Tone Images

Black color half tone images consisting of four color toners, in which one dot image and one dot white image were alternately recorded repeatedly, were formed on a rough paper, SABRE-X80 PAPER manufactured by JAwer Co. The half tone images were visually observed to classify the dot reproducibility into the following four grades.

| |
|---|
| • : Excellent (Dot images are faithfully produced) |
| • : Good |
| • : Slightly poor |
| • : Poor (Dot images are not faithfully produced) | d) Hollow Character (Omissions in Character Images)

Black color character images consisting of four color toners were produced on a thick paper having a weight of 190 g/cm². The images were visually observed to classify the hollow character into the following four grades.

• : Excellent (hollows are hardly observed)
• : Good
• : Slightly poor
• : Poor (hollows are seriously produced)

The results are shown in Table 1.

TABLE 1

| | Residual ratio (%) | Agglomeration Degree (%) | Presence of siloxane structure | Image density | Background fouling | Halftone reproducibility | Hollow character |
|---|---|---|---|---|---|---|---|
| Ex. 1 | 65 | 42 | . | . | . | . | . |
| Ex. 2 | 56 | 46 | . | . | . | . | . |
| Ex. 3 | 58 | 45 | . | . | . | . | . |
| Ex. 4 | 55 | 43 | . | . | . | . | . |
| Ex. 5 | 97 | 10 | . | . | . | . | . |
| Ex. 6 | 53 | 42 | . | . | . | . | . |
| Ex. 7 | 44 | 68 | . | . | . | . | . |
| Ex. 8 | 48 | 56 | . | . | . | . | . |
| Ex. 9 | 43 | 13 | . | . | . | . | . |
| Ex. 10 | 72 | 60 | . | . | . | . | . |
| Ex. 11 | 65 | 35 | . | . | . | . | . |
| Ex. 12 | 65 | 28 | . | . | . | . | . |
| Ex. 13 | 65 | 55 | . | . | . | . | . |
| Ex. 14 | 65 | 48 | . | . | . | . | . |
| Ex. 15 | 65 | 42 | . | . | . | . | . |
| Ex. 16 | 65 | 42 | . | . | . | . | . |
| Comp. Ex. 1 | 54 | 68 | . | . | . | . | . |
| Comp. Ex. 2 | 35 | 43 | . | . | . | . | . |
| Comp. Ex. 3 | 99 | 42 | . | . | . | . | . |
| Comp. Ex. 4 | 96 | 8 | . | . | . | . | . |
| Comp. Ex. 5 | 95 | 12 | . | . | . | . | . |
| Comp. Ex. 6 | 96 | 9 | . | . | . | . | . |
| Comp. Ex. 7 | 65 | 10 | . | . | . | . | . |
| Comp. Ex. 8 | 65 | 73 | . | . | . | . | . |
| Comp. Ex. 9 | 65 | 4 | . | . | . | . | . |

As can be understood from the above-description, the toner of the present invention including the external additive of the present invention can produce high quality images, even when used for a long period of time, without contaminating the image forming apparatus, developing device, photoreceptor and intermediate transfer medium. In addition, images having good reproducibility can be formed on various receiving materials such as rough paper without producing blurred images, scattered images and omissions. In addition, the image forming apparatus using the toner can produce high quality images even when used for a long period of time.

This document claims priority and contains subject matter related to Japanese Patent Application No. 2000-337943, filed on Nov. 6, 2000, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An external additive for a toner, having an average primary particle diameter not greater than 100 nm and comprising:
    an inorganic particulate material; and
    a hydrophobizing agent which is present on the inorganic particulate material in an amount of Ws by weight and present as a free hydrophobizing agent in an amount of Wf by weight, wherein a residual ratio defined as a ratio $\{Ws/(Ws+Wf)\} \times 100$ is from 40 to 98.5%,
    wherein at least one of a compound having an organopolysiloxane structure and a compound having a ring siloxane structure is detected when the external additive is analyzed by a pyrolysis gas chromatography mass spectroscopy method after the external additive is washed with chloroform.

2. The external additive according to claim 1, the external additive including the compound having an organopolysiloxane structure, wherein the compound having an organopolysiloxane structure has the following formula (1):

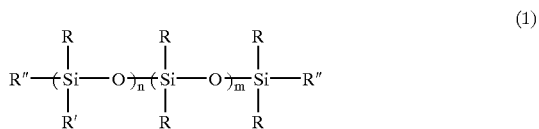

(1)

wherein R represents an alkyl group having from 1 to 3 carbon atoms; R' represents a silicone oil modification group; R" represents an alkyl group having from 1 to 3 carbon atoms or an alkoxyl group; and n and m are independently an integer and satisfy the following relationship:

$$1 \cdot (n+m).$$

3. The external additive according to claim 1, the external additive including the compound having a ring siloxane structure, wherein the compound having a ring siloxane structure has the following formula (2):

(2)

wherein R represents an alkyl group having from 1 to 3 carbon atoms; R' represents a silicone oil modification group; and n is an integer not less than 3.

4. The external additive according to claim 3, wherein n is an integer not less than 4.

5. The external additive according to claim 1, wherein the hydrophobizing agent is a material selected from the group consisting of silicone oils and silicone varnishes.

6. The external additive according to claim 1, wherein the inorganic particulate material is selected from the group consisting of silica, titanium oxide and alumina.

7. A method for preparing an external additive comprising:
    coating an inorganic particulate material having an average primary particle diameter not greater than 100 nm with a hydrophobizing agent; and heating the inorganic particulate material, wherein after the heating the hydrophobizing agent is present on the inorganic particulate material in an amount of Ws by weight and present as a free hydrophobizing agent in an amount of Wf by weight, wherein a residual ratio defined as a ratio $\{Ws/(Ws+Wf)\}\times 100$ is from 40 to 98.5%.

8. The method according to claim 7, wherein the coating is performed while the heating is performed.

9. The method according to claim 7, wherein the heating is performed after the coating is performed.

10. A toner comprising:

a binder resin;

a colorant; and a first external additive, wherein the toner has a volume average particle diameter not greater than 15 μm and an agglomeration degree of from 5 to 70%, and wherein the first external additive has an average particle diameter not greater than 100 nm and comprises:

an inorganic particulate material; and a hydrophobizing agent which is present on the inorganic particulate material in an amount of Ws by weight and present as a free hydrophobizing agent in an amount of Wf by weight, wherein a residual ratio defined as a ratio $\{Ws/(Ws+Wf)\}\times 100$ is from 40 to 98.5%, wherein at least one of a compound having an organopolysiloxane structure and a compound having a ring siloxane structure is detected when the first external additive is analyzed by a pyrolysis gas chromatography mass spectroscopy method after the first external additive is washed with chloroform.

11. The toner according to claim 10, the first external additive including the compound having an organopolysiloxane structure, wherein the compound having an organopolysiloxane structure has the following formula (1):

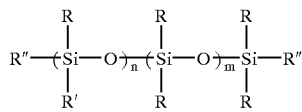

(1)

wherein R represents an alkyl group having from 1 to 3 carbon atoms; R' represents a silicone oil modification group; R" represents an alkyl group having from 1 to 3 carbon atoms or an alkoxyl group; and n and m are independently an integer and satisfy the following relationship:

1·(n+m).

12. The toner according to claim 10, the first external additive including the compound having a ring siloxane structure, wherein the compound having a ring siloxane structure has the following formula (2):

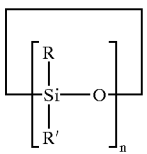

(2)

wherein R an alkyl group having from 1 to 3 carbon atoms; R' represents a silicone oil modification group; and n is an integer not less than 3.

13. The toner according to claim 12, wherein n is an integer not less than 4.

14. The toner according to claim 10, wherein the hydrophobizing agent is a material selected from the group consisting of silicone oils and silicone varnishes.

15. The toner according to claim 10, wherein the inorganic particulate material is selected from the group consisting of silica, titanium oxide and alumina.

16. The toner according to claim 10, further comprising a second external additive having an average primary particle diameter less than the average primary particle diameter of the inorganic particulate material.

17. The toner according to claim 16, further comprising a third external additive comprising a particulate resin, wherein the particulate resin has an average particle diameter greater than the average primary particle diameter of the inorganic particulate material.

18. The toner according to claim 10, further comprising a third external additive comprising a particulate resin, wherein the particulate resin has an average particle diameter greater than the average primary particle diameter of the inorganic particulate material.

19. An image forming apparatus comprising:

at least one image bearing member configured to bear an electrostatic latent image;

an image developer comprising at least one developing section configured to develop the electrostatic latent image with a developer comprising a toner to form a toner image on the image bearing member; and an image transferer configured to transfer the toner image onto a receiving material optionally via an intermediate transfer medium, wherein the toner comprises:

a binder resin;

a colorant; and a first external additive, wherein the toner has a volume average particle diameter not greater than 15 μm and an agglomeration degree of from 5 to 70%, and wherein the first external additive has an average primary particle diameter not greater than 100 nm and comprises:

an inorganic particulate material; and a hydrophobizing agent which is present on the inorganic particulate material in an amount of Ws by weight and present as a free hydrophobizing agent in an amount of Wf by weight, wherein a residual ratio defined as a ratio $\{Ws/(Ws+Wf)\}\times 100$ is from 40 to 98.5%, wherein at least one of a compound having an organopolysiloxane structure and a compound having a ring siloxane structure is detected when the first external additive is analyzed by a pyrolysis gas chromatography mass spectroscopy method after the first external additive is washed with chloroform.

20. The image forming apparatus according to claim 19, wherein the developer is a two-component developer comprising a magnetic carrier and the toner.

21. The image forming apparatus according to claim 19, the image developer including plural developing sections, wherein each of the plural developing sections is configured to develop plural electrostatic latent images on the image bearing member with a different color developer to form a different color toner image on the image bearing member, and wherein the image transferer transfers the plural color toner images onto the receiving material one by one to form a full color image on the receiving material.

22. The image forming apparatus according to claim 21, wherein each of the plural developing sections comprises:
a developing roller configured to bear a layer of the developer thereon; and
a blade configured to form the layer of the developer on the developing roller.

23. The image forming apparatus according to claim 19, including the intermediate transfer member and the image developer including plural developing sections, wherein each of the plural developing sections is configured to develop the electrostatic latent image with a different color developer to form a different color toner image on the image bearing member, and
wherein the image transferer further comprises:
a first transfer member configured to transfer the different color toner images on the image bearing members to the intermediate transfer medium while the first transfer member contacts the intermediate transfer medium and the intermediate transfer medium contacts the image bearing member, to form a full color image on the intermediate transfer medium; and
a second transfer member configured to transfer the full color image on the intermediate transfer medium to the receiving material while the second transfer member contacts the intermediate transfer medium and the intermediate transfer medium contacts the receiving material.

24. The image forming apparatus according to claim 19, wherein the image transferer further comprises:
a transfer member configured to transfer the toner image on the image bearing member to the receiving material while the transfer member contacts the receiving material and the transfer material contacts the image bearing member.

25. The image forming apparatus according to claim 19, including plural image bearing members and the intermediate transfer member, and the image developer including plural developing sections, wherein each of the plural developing sections is configured to develop the electrostatic latent image with a different color developer to form a different color toner image on the respective image bearing member, and
wherein the image transferer further comprises:
a first transfer member configured to transfer the different color toner images on the plural image bearing members to the intermediate transfer medium while the first transfer member contacts the intermediate transfer medium and the intermediate transfer medium contacts the plural image bearing members, to form a full color image on the intermediate transfer medium; and
a second transfer member configured to transfer the full color image on the intermediate transfer medium to the receiving material while the second transfer member contacts the intermediate transfer medium and the intermediate transfer medium contacts the receiving material.

26. The image forming apparatus according to claim 19, the first external additive including the compound having an organopolysiloxane structure, wherein the compound having an organopolysiloxane structure has the following formula (1):

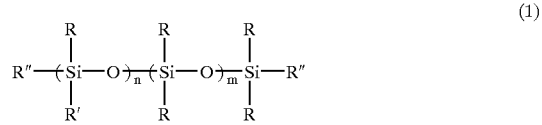

wherein R represents an alkyl group having from 1 to 3 carbon atoms; R' represents a silicone oil modification group; R" represents an alkyl group having from 1 to 3 carbon atoms or an alkoxyl group; and n and m are independently an integer and satisfy the following relationship:

$1 \cdot (n+m)$.

27. The image forming apparatus according to claim 19, the first external additive including the compound having a ring siloxane structure, wherein the compound having a ring siloxane structure has the following formula (2):

wherein R represents an alkyl group having from 1 to 3 carbon atoms; R' represents a silicone oil modification group; and n is an integer not less than 3.

28. The image forming apparatus according to claim 27, wherein n is an integer not less than 4.

29. The image forming apparatus according to claim 19, wherein the hydrophobizing agent is a material selected from the group consisting of silicone oils and silicone varnishes.

30. The image forming apparatus according to claim 19, wherein the inorganic particulate material is selected from the group consisting of silica, titanium oxide and alumina.

31. The image forming apparatus according to claim 19, further comprising a second external additive having an average primary particle diameter less than the average primary particle diameter of the inorganic particulate material.

32. The image forming apparatus according to claim 31, further comprising a third external additive comprising a particulate resin, wherein the particulate resin has an average particle diameter greater than the average primary particle diameter of the inorganic particulate material.

33. The image forming apparatus according to claim 19, further comprising a third external additive comprising a particulate resin, wherein the particulate resin has an average particle diameter greater than the average primary particle diameter of the inorganic particulate material.

* * * * *